US012742925B2

(12) United States Patent
Dainese, Jr. et al.

(10) Patent No.: US 12,742,925 B2
(45) Date of Patent: Sep. 22, 2026

(54) HOLLOW-CORE OPTICAL FIBERS

(71) Applicant: CORNING INCORPORATED, Corning, NY (US)

(72) Inventors: Paulo Clovis Dainese, Jr., Painted Post, NY (US); Ming-Jun Li, Horseheads, NY (US); Xiaojun Liang, Chino Hills, CA (US); Dan Trung Nguyen, Painted Post, NY (US); Ilia Andreyevich Nikulin, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 421 days.

(21) Appl. No.: 18/226,324

(22) Filed: Jul. 26, 2023

(65) Prior Publication Data

US 2024/0036250 A1 Feb. 1, 2024

Related U.S. Application Data

(60) Provisional application No. 63/467,087, filed on May 17, 2023, provisional application No. 63/467,064, (Continued)

(51) Int. Cl.
*G02B 6/02* (2006.01)
*C03B 37/012* (2006.01)
(Continued)

(52) U.S. Cl.
CPC ........ *G02B 6/02328* (2013.01); *C03B 37/012* (2013.01); *C03B 37/0122* (2013.01); (Continued)

(58) Field of Classification Search
CPC ............ G02B 6/02328; G02B 6/02361; G02B 6/02304; G02B 6/03688
See application file for complete search history.

(56) References Cited

U.S. PATENT DOCUMENTS 6,480,659 B1 11/2002 Patlakh et al.
7,272,285 B2 9/2007 Benoit et al.
(Continued)

FOREIGN PATENT DOCUMENTS

CN 206134312 U 4/2017
CN 110100196 A 8/2019
(Continued)

OTHER PUBLICATIONS

Hayashi et al. ("Numerical modeling of a hybrid hollow-core fiber for enhanced mid-infrared guidance", vol. 29, No. 11, May 24, 2021, Optics Express, pp. 17042-17052) (Year: 2021).*
(Continued)

*Primary Examiner* — Michelle R Connelly
(74) *Attorney, Agent, or Firm* — Kevin L. Bray

(57) ABSTRACT

A hollow-core optical fiber may include a hollow-core extending along a central longitudinal axis of the hollow-core optical fiber; a substrate; a first cladding positioned between the central longitudinal axis and an inner surface of the substrate, the first cladding surrounding the central longitudinal axis of the hollow-core optical fiber and having a Bragg structure configured to provide a photonic bandgap operable to confine an optical signal with a wavelength λ propagating in the hollow-core of the hollow-core optical fiber; and a second cladding positioned between the central longitudinal axis of the hollow-core optical fiber and the inner surface of the substrate, the second cladding surrounding the central longitudinal axis of the hollow-core optical fiber and including a plurality of cladding elements configured to provide an anti-resonant effect at the wavelength λ, the anti-resonant effect operable to confine the optical signal at the wavelength λ in the hollow-core.

19 Claims, 10 Drawing Sheets

Related U.S. Application Data filed on May 17, 2023, provisional application No. 63/394,126, filed on Aug. 1, 2022.

(51) Int. Cl.
*C03B 37/025* (2006.01)
*G02B 6/032* (2006.01)
*G02B 6/036* (2006.01)

(52) U.S. Cl.
CPC ...... *C03B 37/0256* (2013.01); *G02B 6/02304* (2013.01); *G02B 6/02361* (2013.01); *G02B 6/02376* (2013.01); *G02B 6/032* (2013.01); *G02B 6/03622* (2013.01); *C03B 2203/14* (2013.01); *C03B 2203/16* (2013.01)

(56) References Cited

U.S. PATENT DOCUMENTS

| | | | | |
|---|---|---|---|---|
| 7,310,466 | B2 * | 12/2007 | Fink | G02B 6/02361 385/100 |
| 8,181,485 | B2 | 5/2012 | Coffey et al. | |
| 8,359,884 | B2 | 1/2013 | Hawtof | |
| 8,438,876 | B2 | 5/2013 | Noni, Jr. | |
| 10,185,084 | B2 | 1/2019 | Butler et al. | |
| 10,393,956 | B2 | 8/2019 | Russell et al. | |
| 10,816,721 | B1 | 10/2020 | Chenard et al. | |
| 10,859,763 | B2 | 12/2020 | Xu et al. | |
| 12,298,554 | B2 | 5/2025 | Fiacco et al. | |
| 2004/0223715 | A1 | 11/2004 | Benoit et al. | |
| 2005/0226579 | A1 | 10/2005 | Fink et al. | |
| 2005/0232560 | A1 | 10/2005 | Knight et al. | |
| 2006/0193583 | A1 | 8/2006 | Dong et al. | |
| 2006/0201206 | A1 | 9/2006 | Benoit et al. | |
| 2007/0053640 | A1 | 3/2007 | Goell et al. | |
| 2017/0160467 | A1 | 6/2017 | Poletti et al. | |
| 2020/0004010 | A1 | 1/2020 | Dalrymple et al. | |
| 2020/0024178 | A1 | 1/2020 | Corrado et al. | |
| 2020/0278491 | A1 | 9/2020 | Poletti et al. | |
| 2024/0034664 | A1 | 2/2024 | Dainese et al. | |
| 2024/0036249 | A1 | 2/2024 | Drake et al. | |
| 2024/0036252 | A1 | 2/2024 | Dainese et al. | |
| 2024/0036253 | A1 | 2/2024 | Dainese et al. | |
| 2024/0150218 | A1 | 5/2024 | Dainese et al. | |
| 2024/0150219 | A1 | 5/2024 | Dainese et al. | |
| 2025/0197273 | A1 | 6/2025 | Drake et al. | |

FOREIGN PATENT DOCUMENTS

| | | | |
|---|---|---|---|
| CN | 111257992 | A | 6/2020 |
| CN | 114721084 | A | 7/2022 |
| GB | 2526879 | A | 12/2015 |
| WO | 2003/050571 | A2 | 6/2003 |
| WO | 2020/210208 | A1 | 10/2020 |
| WO | 2021/009239 | A1 | 1/2021 |

OTHER PUBLICATIONS

Amrani, et al., "Low-loss single-mode hybrid-lattice hollow-core photonic-crystal fibre", Light: Science & Applications, vol. 10, No. 1, 2021,pp. 1-12.

Francesco Poletti: "Nested antiresonant nodeless hollow core fiber", Optics Express, vol. 22, No. 20, Oct. 6, 2014 (Oct. 6, 2014), pp. 23807-23828.

Hu et al., "Design of Negative Curvature Hollow Core Fiber Based on Reinforcement Learning." Journal of Lightwave Technology 38, No. 7 (2020), pp. 1959-1965.

International Search Report and Written Opinion of the International Searching Authority; PCT/US2023/028627; dated Nov. 17, 2023; 12 pages; European Patent Office.

Khashan et al., "Dispersion of the optical constants of quartz and polymethyl methacrylate glasses in a wide spectral range: 0.2-3 µm." Optics Communications 188, No. 1-4 (2001), pp. 129-139.

Liu et al., "Fabrication and sensing applications of special microstructured optical fibers." Selected Topics on Optical Fiber Technologies and Applications; Xu, F., Mou, C., Eds (2017), pp. 1-20.

Habib et al. "Single-mode, low loss hollow-core anti-resonant fiber designs", Optics Express, vol. 27, No. 4, Feb. 18, 2019 (Feb. 18, 2019), 13 pages.

Shemuly, et al., "Asymmetric wave propagation in planar chiral fibers." Optics express, vol. 21, No. 2, 2013, pp. 1465-1472.

Yang, et al., "Low Loss Hollow-Core Connecting-Circle Negative-Curvature Fibres", IEEE Photonics Journal, vol. 13, No. 1, 2021, pp. 1-10.

Zinin et al. "Hollow core Bragg fiber with antiresonant intermediate layer", Proceedings of Spie, vol. 10176, Nov. 9, 2016, pp. 101760L-101760L.

Zhu, Yunhao, Ningfang Song, Fuyu Gao, and Xiaobin Xu. "Low loss hollow-core antiresonant fiber with nested supporting rings." Optics Express 29, No. 2 (2021): 1659-1665.

A. D. Pryamikov et al., "Demonstration of a waveguide regime for a silica hollow—core microstructured optical fiber with a negative curvature of the core boundary in the spectral region > 3.5 µm", Optics Express, vol. 19, 2011, pp. 1441-1448.

B. Temelkuran et al., "Wavelength-scalable hollow optical fibres with large photonic bandgaps for CO2 laser transmission", Nature, vol. 420, 2002, pp. 650-653.

C. Wei et al., "Negative curvature fibers", Advances in Optics and Photonics, vol. 9, 2017, pp. 504-561.

E. N. Fokoua, et al., "Analysis of light scattering from surface roughness in hollowcore photonic bandgap fibers," Opt. Express, vol. 20, No. 19, 2012, pp. 20980-20991.

F. Poletti, "Nested antiresonant nodeless hollow core fiber", Opt. Express, vol. 22, 2014, pp. 23807-23828.

G. T. Jasion et al., " Hollow Core NANF with 0.28 dB/km Attenuation in the C and L Bands", paper Th4B.4, OFC 2020.

Hayashi et al., "Numerical modeling of a hybrid hollow-core fiber for enhanced mid-infrared guidance", Optics Express, vol. 29, 2021, pp. 17042-17052.

P. St.J. Russell, "Photonic-cystal fibers," J. Lightwave Technol., 2006, vol. 24, pp. 4729-4749.

P. Yeh, et al., "Theory of Bragg fiber", Opt. Soc. Am., vol. 68, 1978, pp. 1196-1201.

S. G. Johnson et al., "Low-loss asymptotically single-mode propagation in large-core OmniGuide fibers", Opt. Express, vol. 9, 2001, pp. 748-779.

Sakr et al., "Hollow Core NANFs with Five Nested Tubes and Record Low Loss at 850, 1060, 1300 and 1625nm", OFC 2021,.

Shaha, et al., "Low loss double cladding nested hollow core antiresonant fiber", OSA Continuum, vol. 3, No. 9, 2020, pp. 2512-2524.

Y. Xu et al., "Asymptotic Matrix Theory of Bragg Fibers" J. of Lightwave Technol., vol. 20, 2002, pp. 428-440.

Zhu, et al., "Low loss hollow-core antiresonant fiber with nested supporting rings", Optics Express, vol. 29, No. 2, 2021, pp. 1659-1665.

* cited by examiner

HOLLOW-CORE OPTICAL FIBERS

This application claims the benefit of priority under 35 U.S.C § 120 of U.S. Provisional Application Ser. No. 63/467,087 filed on May 17, 2023, U.S. Provisional Application Ser. No. 63/467,064 filed on May 17, 2023, and U.S. Provisional Application Ser. No. 63/394,126 filed on Aug. 1, 2022, the content of which is relied upon and incorporated herein by reference in its entirety.

BACKGROUND

Field

The present specification generally relates to optical fibers and, more specifically, to hollow-core optical fibers.

Technical Background

Hollow-core optical fibers transmit light through a hollow core. Loss of light from the hollow core along the length of the optical fiber may be an impediment to implementing hollow-core optical fibers in practical applications. Accordingly, a need exists for hollow-core optical fibers having structures that confine light to the hollow core, thereby reducing light loss from the hollow core along the length of the optical fiber.

SUMMARY

According to a first aspect of the present disclosure, a hollow-core optical fiber comprises a hollow core extending along a central longitudinal axis of the hollow-core optical fiber; a substrate, the substrate comprising a tubular shape and an inner surface surrounding the central longitudinal axis of the hollow-core optical fiber; a first cladding positioned between the central longitudinal axis of the hollow-core optical fiber and the inner surface of the substrate, the first cladding surrounding the central longitudinal axis of the hollow-core optical fiber and comprising a Bragg structure, the Bragg structure configured to provide a photonic bandgap operable to confine an optical signal with a wavelength $\lambda$ propagating in the hollow core of the hollow-core optical fiber; and a second cladding positioned between the central longitudinal axis of the hollow-core optical fiber and the inner surface of the substrate, the second cladding surrounding the central longitudinal axis of the hollow-core optical fiber and comprising a plurality of cladding elements, the plurality of cladding elements configured to provide an anti-resonant effect at the wavelength $\lambda$, the anti-resonant effect operable to confine the optical signal at the wavelength $\lambda$ in the hollow core.

A second aspect of the present disclosure may include the first aspect, wherein the second cladding is positioned between the first cladding and the central longitudinal axis of the hollow-core optical fiber.

A third aspect of the present disclosure may include either the first aspect or second aspect, wherein the first cladding is in direct contact with the second cladding.

A fourth aspect of the present disclosure may include any of the first through third aspects, wherein the first cladding is in direct contact with the inner surface of the substrate.

A fifth aspect of the present disclosure may include any of the first through fourth aspects, wherein the Bragg structure comprises alternating concentric first layers and second layers, the first layers comprising a first refractive index at the wavelength $\lambda$ and the second layers comprising a second refractive index at the wavelength $\lambda$, the second refractive index differing from the first refractive index.

A sixth aspect of the present disclosure may include the fifth aspect, wherein the Bragg structure comprises 3 or more first layers.

A seventh aspect of the present disclosure may include the fifth or sixth aspect, wherein the Bragg structure comprises 30 or fewer first layers.

An eighth aspect of the present disclosure may include the fifth or sixth aspect, wherein the Bragg structure comprises 15 or fewer first layers.

A ninth aspect of the present disclosure may include any of the fifth through eighth aspects, wherein each first layer has a thickness from 0.1 μm to 4.0 μm.

A tenth aspect of the present disclosure may include any of the fifth through ninth aspects, wherein a difference between the first refractive index and the second refractive index is greater than 0.10.

An eleventh aspect of the present disclosure may include any of the fifth through ninth aspects, wherein a difference between the first refractive index and the second refractive index is greater than 0.30.

A twelfth aspect of the present disclosure may include any of the fifth through eleventh aspects, wherein the first layers comprise glass and the second layers comprise air.

A thirteenth aspect of the present disclosure may include the twelfth aspect, wherein the first layers consist essentially of the glass.

A fourteenth aspect of the present disclosure may include the twelfth or thirteenth aspect, wherein the second layers further comprise the glass.

A fifteenth aspect of the present disclosure may include the any of the twelfth through fourteenth aspects, wherein the first layers are interconnected.

A sixteenth aspect of the present disclosure may include any of the fifth through fifteenth aspects, wherein the first layers are interconnected by a plurality of ribs extending parallel to the central longitudinal axis of the hollow-core optical fiber.

A seventeenth aspect of the present disclosure may include the sixteenth aspect, wherein the plurality of ribs comprise silica-based glass.

An eighteenth aspect of the present disclosure may include either the sixteenth aspect or seventeenth aspect, wherein each of the plurality of ribs has a width from 1 μm to 5 μm.

A nineteenth aspect of the present disclosure may include any of the sixteenth through eighteenth aspects, wherein each of the plurality of ribs has substantially the same width.

A twentieth aspect of the present disclosure may include any of the sixteenth through nineteenth aspects, wherein the plurality of ribs directly contacting an inner surface of a selected first layer and the plurality of ribs directly contacting an outer surface of the selected first layer do not lie on the same radius of the hollow-core optical fiber.

A twenty-first aspect of the present disclosure may include any of the sixteenth through twentieth aspects, wherein ribs directly contacting outer surfaces of alternate first layers are positioned on a common radius of the hollow-core optical fiber.

A twenty-second aspect of the present disclosure may include any of the sixteenth through twenty-first aspects, wherein each of the plurality of ribs are positioned on radii of the hollow-core optical fiber that do not pass through the plurality of cladding elements.

A twenty-third aspect of the present disclosure may include any of the sixteenth through twenty-second aspects, wherein each first layer is connected to another first layer by from 2 to 8 ribs.

A twenty-fourth aspect of the present disclosure may include the fifteenth aspect, wherein the first layers are interconnected by a plurality of tubes extending parallel to the central longitudinal axis.

A twenty-fifth aspect of the present disclosure may include the twenty-fourth aspect, wherein the plurality of tubes comprise glass.

A twenty-sixth aspect of the present disclosure may include either the twenty-fourth aspect or twenty-fifth aspect, wherein each of the plurality of tubes has an inner diameter from 1 μm to 20 μm.

A twenty-seventh aspect of the present disclosure may include any of the twenty-fourth through twenty-sixth aspects, wherein each of the plurality of tubes has a wall thickness of from 0.1 μm to 5 μm.

A twenty-eighth aspect of the present disclosure may include any of the twenty-fourth through twenty-seventh aspects, wherein each of the plurality of tubes has substantially the same inner diameter.

A twenty-ninth aspect of the present disclosure may include any of the twenty-fourth through twenty-eighth aspects, wherein each of the plurality of tubes has substantially the same wall thickness.

A thirtieth aspect of the present disclosure may include any of the twenty-fourth through twenty-ninth aspects, wherein tubes directly contacting an inner surface of a selected first layer and tubes directly contacting an outer surface of the selected first layer do not lie on the same radius of the hollow-core optical fiber.

A thirty-first aspect of the present disclosure may include any of the twenty-fourth through thirtieth aspects, wherein tubes directly contacting outer surfaces of alternate first layers are positioned on a common radius of the hollow-core optical fiber.

A thirty-second aspect of the present disclosure may include any of the twenty-fourth through thirty-first aspects, wherein each of the plurality tubes are positioned on radii of the hollow-core optical fiber that do not pass through the plurality of cladding elements.

A thirty-third aspect of the present disclosure may include any of the twenty-fourth through thirty-second aspects, wherein each first layer is connected to another first layer by from 2 to 8 tubes.

A thirty-fourth aspect of the present disclosure may include any of the first through thirty-third aspects, wherein the second cladding comprises from 3 to 8 cladding elements.

A thirty-fifth aspect of the present disclosure may include any of the first through thirty-fourth aspects, wherein the second cladding comprises from 5 to 6 cladding elements.

A thirty-sixth aspect of the present disclosure may include any of the first through thirty-fifth aspects, wherein each cladding element is spaced apart from adjacent cladding elements in a circumferential direction about the central longitudinal axis.

A thirty-seventh aspect of the present disclosure may include any of the first through thirty-sixth aspects, wherein each cladding element is spaced apart from adjacent cladding elements by a distance of less than or equal to 6 μm without contacting.

A thirty-eighth aspect of the present disclosure may include any of the first through thirty-seventh aspects, wherein each of the plurality of cladding elements comprises a cladding element central longitudinal axis parallel to the central longitudinal axis of the hollow-core optical fiber.

A thirty-ninth aspect of the present disclosure may include any of the first through thirty-eighth aspects, wherein each of the plurality of cladding elements extends in a direction parallel to the central longitudinal axis of the hollow-core optical fiber and each of the plurality of cladding elements comprises a capillary.

A fortieth aspect of the present disclosure may include the thirty-ninth aspect, wherein each capillary has a wall thickness from 0.1 μm to 4.0 μm.

A forty-first aspect of the present disclosure may include either the thirty-ninth aspect or the fortieth aspect, wherein each capillary has an inner diameter from 12 μm to 50 μm.

A forty-second aspect of the present disclosure may include any of the first through forty-first aspects, wherein each of the plurality of cladding elements extends in a direction parallel to the central longitudinal axis of the hollow-core optical fiber and each of the plurality of cladding elements comprises a glass sheet configured as a spiral.

A forty-third aspect of the present disclosure may include the forty-second aspect, wherein each cladding element comprises a cladding element central longitudinal axis parallel to the central longitudinal axis of the hollow-core optical fiber, and the spiral is on a cross-section of the cladding element perpendicular to the cladding element central longitudinal axis.

A forty-fourth aspect of the present disclosure may include either the forty-second aspect or the forty-third aspect, wherein the spiral comprises from 2 to 12 turns.

A forty-fifth aspect of the present disclosure may include any of the forty-second through forty-fourth aspects, wherein the glass sheet has a thickness from 0.1 μm to 4.0 μm.

A fortieth forty-sixth aspect of the present disclosure may include any of the first through forth-fifth aspects, wherein the hollow core comprises one or more gasses.

A forty-seventh aspect of the present disclosure may include any of the first through forty-sixth aspects, wherein the hollow core consists essentially of air.

A forty-eighth aspect of the present disclosure may include any of the first through forty-seventh aspects, wherein the wavelength $\lambda$ is in a range from 350 nm to 8000 nm.

A forty-ninth aspect of the present disclosure may include any of the first through forty-eighth aspects, wherein the first cladding and the second cladding are configured such that a confinement loss of a fundamental mode of the optical signal propagating in the hollow-core optical fiber is less than $10^{-2}$ dB/km at the wavelength $\lambda$.

A fiftieth aspect of the present disclosure may include the forty-ninth aspect, wherein the confinement loss of the fundamental mode at the wavelength $\lambda$ is less than $10^{-3}$ dB/km.

A fifty-first aspect of the present disclosure may include the forty-ninth aspect, wherein the confinement loss of the fundamental mode at the wavelength $\lambda$ is less than $10^{-4}$ dB/km.

DETAILED DESCRIPTION

Figure 1:
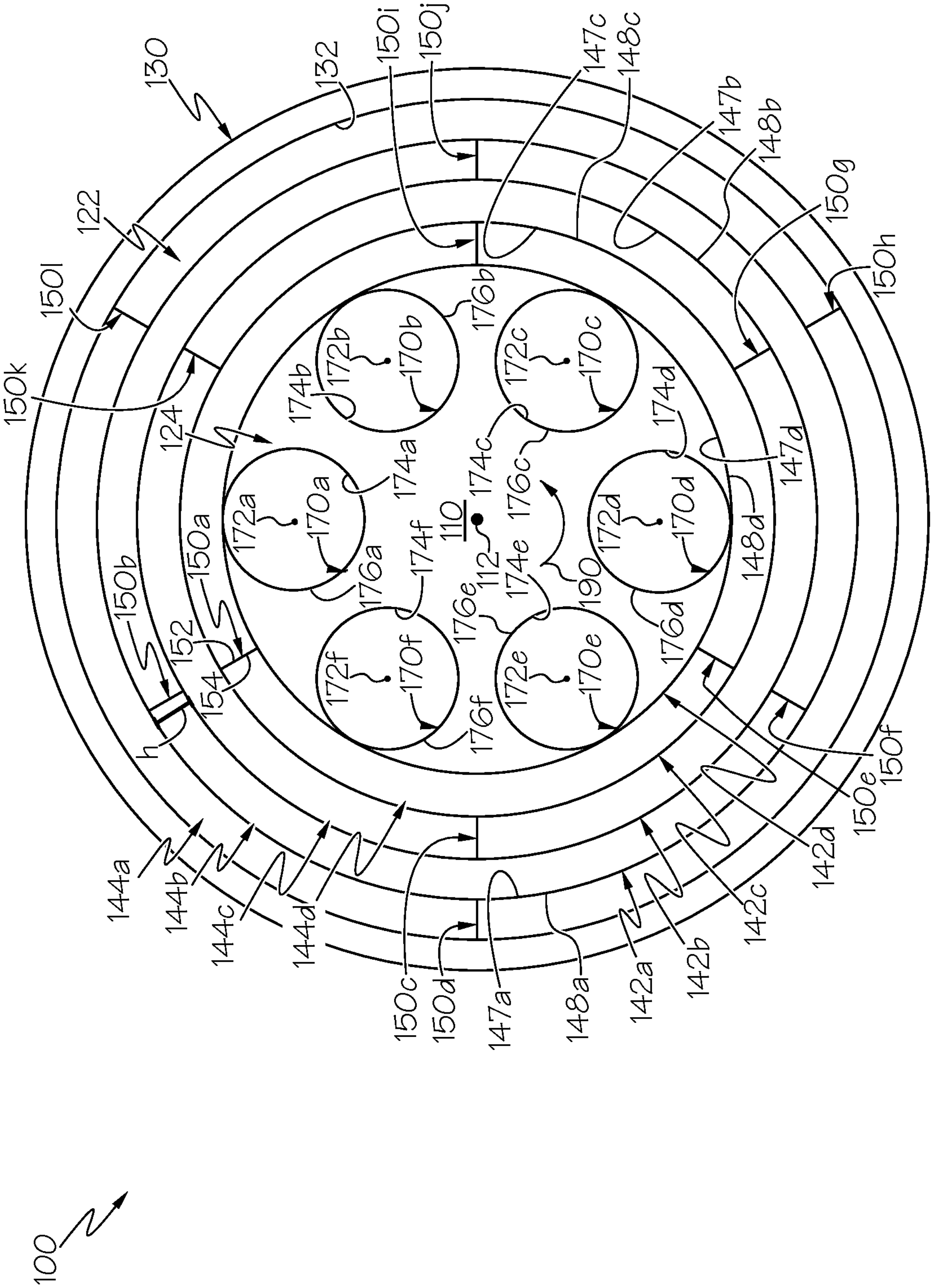
FIG. 1 schematically depicts a cross-sectional view of a hollow-core optical fiber according to one or more embodiments described herein.

Reference will now be made in detail to various embodiments of hollow-core optical fibers. Whenever possible, the same reference numerals will be used throughout the drawings to refer to the same or like parts. In embodiments, hollow-core optical fibers may comprise a hollow core, a substrate, and cladding elements positioned between the hollow core and the substrate. The hollow-core optical fiber may comprise a first cladding and a second cladding, where the first cladding comprises a Bragg structure and the second cladding comprises one or more cladding elements. Embodiments of hollow-core optical fibers will be described in further detail herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Various components described herein may be referred to as "directly connected" or "indirectly connected". Components are directly connected when they are joined to one another with no intervening structure. Components may be joined by fusing, welding, adhesives, or any other suitable attachment means. Components are "indirectly connected" when they are joined to one another with intervening structure. Examples of intervening structure include welding aids (e.g. frits, solders, fluxes), adhesives, and bonding materials. In embodiments, components connected indirectly are connected only by a welding aid, adhesive, or bonding material. The term "connected" means "directly connected" or "indirectly connected". Components "directly connected" to one another are said to be in direct contact with each other. Components "indirectly connected" to one another are said to be in indirect contact with each other. Components "connected" to one another are in direct or indirect contact with each other.

As used herein, the singular forms "a," "an" and "the" include plural referents unless the context clearly dictates otherwise. Thus, for example, reference to "a" component includes aspects having two or more such components, unless the context clearly indicates otherwise.

Without intending to be bound by theory, an optical signal (i.e., light) may be passed through the hollow core of a hollow-core optical fiber. As used herein, "attenuation" refers to the reduction of intensity of the optical signal passing through the hollow-core optical fiber. Attenuation of the optical signal being guided through the hollow-core optical fiber may be reduced by various effects, including but not limited to, an anti-resonant effect, an inhibited coupling mechanism, and a photonic bandgap effect. Each of these effects may reduce the leakage of light from the hollow core of the optical fiber to the cladding elements of the optical fiber, which in turn reduces the attenuation of the optical signal propagating in the hollow core. Said differently, each of these effects may improve the confinement of light to the hollow core of the optical fiber, thereby reducing the attenuation of the optical signal propagating in the hollow core. Embodiments of hollow-core optical fibers described herein may comprise structures that utilize one or more of these effects to reduce the attenuation of an optical signal passing through the hollow-core optical fiber.

As used herein, "anti-resonance" or an "anti-resonant effect" refers to an effect that occurs when the thickness of a material (e.g. the material used to form cladding elements) is proportional to a wavelength of light passing through the hollow-core optical fiber such that the light passing through the hollow-core optical fiber is confined to the hollow core. Without intending to be bound by theory, an anti-resonant effect occurs when the thickness of a material satisfies the quarter-wave condition (phase accumulated on a single pass is one quarter of 2π, and any odd multiple of a quarter wave). When this condition is applied to the thickness of the material, light is confined to the hollow core with minimum leakage to the cladding. In other words, this condition helps inhibit coupling between core modes and cladding modes, resulting in low loss of transmission and increased confinement of the optical signal in the hollow core. The anti-resonant effect may, in one embodiment, be satisfied by a material having a thickness given by Equation 1:

$$t_{AR} = \frac{(2m-1)\lambda}{\left(4\{n^2-1\}^{1/2}\right)} \quad \text{Equation 1}$$

In Equation 1, $t_{AR}$ is the thickness of the material that satisfies the anti-resonance condition, λ is the wavelength of the optical signal, m is an integer that is greater than or equal to 1, and n is the refractive index of the material. It should be noted that Equation 1 represents an ideal thickness of a material that would satisfy the anti-resonant effect, and that material thicknesses that are not exactly equal to $t_{AR}$ may also provide increased confinement of light to the hollow core. For example, without limitation, it is contemplated that a material having a thickness within 10% of $t_{AR}$ (from 90% $t_{AR}$ to 110% $t_{AR}$) may be operable to confine or substantially confine light to the hollow core.

As used herein, an "inhibited coupling mechanism" refers to an effect that occurs when cladding elements having negative curvature inhibit coupling between core modes and cladding modes to reduce light leakage from the hollow core. As used herein, "negative curvature" refers to cladding elements having a surface with a convex shape facing the central longitudinal axis of the hollow core optical fiber. Without intending to be bound by theory, using cladding elements having a surface with a convex shape facing the central longitudinal axis of the hollow-core optical fiber may reduce the amount of light that contacts the cladding elements and may also reduce the light leaking through the cladding elements and the gaps between these cladding elements. In turn, this may reduce attenuation of the optical signal due to the leaking through the cladding elements and the gaps between them and may also reduce light scattering that may occur when light contacts the surface of the cladding elements.

As used herein, a "photonic band gap effect" refers to an effect that occurs when cladding elements are arranged periodically with a spacing or separation commensurate with the wavelength of light guided by the hollow core. When configured to provide a photonic band gap, the cladding elements operate to exclude wavelengths of light within the wavelength range defined by the photonic band gap from entering the cladding from the core. Attenuation is accordingly reduced. In one embodiment, a photonic band gap is produced by configuring the cladding to include multiple layers of alternating materials with varying refractive indexes. Each layer may at least partially reflect an optical signal within a certain range of wavelengths. This may prevent light within that range of wavelengths from propagating through the cladding.

Referring now to FIG. 1, a hollow-core optical fiber 100 may comprise a hollow core 110 extending along a central longitudinal axis 112 of the fiber and a substrate 130. Generally, the hollow core 110 is the light-guiding portion of the hollow-core optical fiber 100. The first cladding 122 and the second cladding 124 may be operable to prevent the leakage of light out of the hollow core 110, generally, by causing destructive interference of light passing through the cladding elements, resulting in light propagating in the hollow core 110. Hollow core 110 has a radius that extends in an orthogonal direction from central longitudinal axis 112 to the closest point of contact with one of the cladding elements 120. The diameter of hollow core 110 is twice the radius of hollow core 110. The diameter of hollow core 110 is greater than or equal to 15 microns, or greater than or equal to 20 microns, or greater than or equal to 25 microns, or less than or equal to 45 microns, or less than or equal to 40 microns, or less than or equal to 35 microns, or in a range from 15 microns to 45 microns, or in a range from 20 microns to 40 microns, or in a range from 25 microns to 35 microns.

In embodiments, the substrate 130 may comprise a tubular shape comprising an inner surface 132 surrounding the central longitudinal axis 112 of the hollow-core optical fiber 100. The substrate 130 may be operable to support any cladding elements included in the hollow-core optical fiber 100. In embodiments, the outer diameter of the substrate 130 may be from 100 μm to 500 μm. For example, without limitation, the outer diameter of the substrate 130 may be from 100 μm to 500 μm, from 200 μm to 500 μm, from 300 μm to 500 μm, from 400 μm to 500 μm, from 100 μm to 400 μm, from 100 μm to 300 μm, from 100 μm to 200 μm, or any combination or subset of these ranges. In embodiments, the outer diameter of the substrate may be from 100 μm to 250 μm. In embodiments, the wall thickness of the substrate may be from 20 μm to 500 μm. For example, without limitation, the wall thickness of the substrate may be from 20 μm to 500 μm, from 100 μm to 500 μm, from 200 μm to 500 μm, from 300 μm to 500 μm, from 400 μm to 500 μm, from 20 μm to 400 μm, from 20 μm to 300 μm, from 20 μm to 200 μm, from μm to 100 μm, or any combination or subset of these ranges.

In embodiments, one or more protective coatings (not depicted) may be positioned on an exterior surface of the substrate 130. These coatings may be, for example, organic materials, such as plastics or polymers, and may protect the hollow-core optical fiber 100 from the physical environment. The coatings may include a primary coating with a low Young's modulus (e.g. <1 MPa) surrounding and adjacent to the substrate 130 and a secondary coating with a high Young's modulus (e.g. >1000 MPa) surrounding and adjacent to the primary coating. Representative materials for primary and secondary coatings include acrylate materials (e.g. urethane acrylates). In embodiments, a coated fiber may have an outer diameter of 242 microns, 200 microns, or 190 microns. In embodiments the thickness of the primary coating in a radial direction is greater than microns, or greater than 15 microns, or greater than 20 microns, or less than 45 microns, or less than 40 microns, or less than 35 microns, or in a range from 10 microns to 45 microns, or in a range from 15 microns to 40 microns, or in a range from 20 microns to 35 microns. In embodiments the thickness of the secondary coating in a radial direction is greater than 10 microns, or greater than 15 microns, or greater than 20 microns, or less than 45 microns, or less than 40 microns, or less than 35 microns, or in a range from 10 microns to 45 microns, or in a range from microns to 40 microns, or in a range from 20 microns to 35 microns.

The hollow-core optical fiber 100 comprises a first cladding 122 and a second cladding 124. The first cladding 122 may be positioned between the central longitudinal axis 112 of the hollow-core optical fiber 100 and the inner surface 132 of the substrate 130. The first cladding 122 surrounds the central longitudinal axis 112 of the hollow-core optical fiber 100 and comprises a Bragg structure. In embodiments, the Bragg structure is configured to provide a photonic bandgap operable to confine an optical signal with a wavelength λ propagating in the hollow core 110 of the hollow-core optical fiber 100. In embodiments, the first cladding 122 is in direct contact with the inner surface 132 of the substrate 130.

The second cladding 124 may be positioned between the central longitudinal axis 112 of the hollow-core optical fiber 100 and the inner surface 132 of the substrate 130. The second cladding 124 my surround the central longitudinal axis 112 of the hollow-core optical fiber 100. The second cladding 124 comprises a plurality of cladding elements 170 (i.e., cladding elements 170*a*, 170*b*, 170*c*, 170*d*, 170*e*, and 170*f* in the embodiment depicted in FIG. 1) configured to provide an anti-resonant effect at the wavelength λ, the anti-resonant effect operable to confine the optical signal at the wavelength λ in the hollow core 110. In embodiments, the second cladding 124 is positioned between the first cladding 122 and the central longitudinal axis 112 of the hollow-core optical fiber 100. The first cladding 122 may be in direct contact with the second cladding 124.

In embodiments, the Bragg structure comprises alternating concentric first layers 142 (i.e., first layers 142*a*, 142*b*, 142*c*, and 142*d* in the embodiment depicted in FIG. 1) and second layers 144 (i.e., second layers 144*a*, 144*b*, 144*c*, and 144*d* in the embodiment depicted in FIG. 1). The concentric first layers 142 and concentric second layers 144 surround the central longitudinal axis 112 in a circumferential (azimuthal) direction and preferably have a circular cross-sectional shape.

The first layers 142 comprise a first refractive index at the wavelength λ of the optical signal confined in hollow core 110 and the second layers 144 comprise a second refractive index at the wavelength λ of the optical signal confined in hollow core 110. In embodiments, the first refractive index is different from the second refractive index. In embodiments, the first refractive index is greater than the second refractive index. In embodiments, a difference between the first refractive index and the second refractive index is greater than 0.01, or greater than 0.05, or greater than 0.10, or greater than 0.20, or greater than 0.30, or greater than 0.40, or in a range from 0.01 to 0.70, or in a range from 0.05 to 0.60, or in a range from 0.10 to 0.55, or in a range from 0.20 to 0.50, or in a range from 0.25 to 0.45. In embodiments, the first layers 142 comprise or consist essentially of glass. In one embodiment, the glass is a silica-based glass. Silica-based glass may include pure silica or silica that is doped with one or more dopants to modify the index of refraction of the silica. In embodiments, the second layers 144 comprise air. Without intending to be bound by theory, when the first layers 142 comprise silica-based glass and the second layers 144 comprise air, the difference in refractive index between the first layers 142 and the second layers 144 may be relatively large. For example, the difference in refractive index may be about 0.4 to about 1.8 when alternating layers of silica-based glass and air are used. It should be understood that the difference in refractive index between layers in a glass/glass or glass/polymer Bragg structure are generally lower than the difference in refractive index between layers in a glass/air Bragg structure. A relatively large difference in refractive index between the alternating layers of a Bragg structure may improve the Bragg structure's ability to confine light to the hollow core by the photonic bandgap effect.

In embodiments, the Bragg structure comprises 3 or more and 100 or fewer first layers 142. For example, without limitation, the Bragg structure may comprise 3 or more, 5 or more, 10 or more, or 15 or more first layers 142. In embodiments, the Bragg structure comprises 75 or fewer, or 60 or fewer, or 50 or fewer, or 40 or fewer, or 30 or fewer, or 20 or fewer, or 15 or fewer, or 10 or fewer first layers 142. Without intending to be bound by theory, increasing the number of first layers 142 in the Bragg structure may improve the Bragg structure's ability to confine light to the hollow core by the photonic bandgap effect. An increased number of layers may provide additional opportunities for light to be reflected or excluded from the Bragg structure to the hollow core, thereby improving confinement of light to the hollow core. It should be noted that the number of layers may be limited by the dimensions of the first layers 142, second layers 144, and the hollow-core optical fiber 100, as well as limitations in the manufacturing process of the hollow-core optical fibers 100.

In embodiments, each first layer 142 has a thickness of from 0.1 μm to 4.0 μm. As described herein, the thickness of a first layer 142 is the distance between the inner surface 147 (i.e., inner surface 147*a*, 147*b*, 147*c*, and 147*d* in the embodiment depicted in FIG. 1) of the first layer 142 and the respective outer surface 148 (i.e., outer surface 148*a*, 148*b*, 148*c*, and 148*d* in the embodiment depicted in FIG. 1) of the first layer 142. For example, without limitation, each first layer 142 may have a thickness from 0.1 μm to 4.0 μm, from 0.5 μm to 4.0 μm, from 1 μm to 4.0 μm, from 1.5 μm to 4.0 μm, from 2.0 μm to 4.0 μm, from 2.5 μm to 4.0 μm, from 3.0 μm to 4.0 μm, from 3.5 μm to 4.0 μm, 0.1 μm to 3.5 μm, 0.1 μm to 3.0 μm, 0.1 μm to 2.5 μm, 0.1 μm to 2.0 μm, 0.1 μm to 1.5 μm, 0.1 μm to 1.0 μm, 0.1 μm to 0.5 μm, or any combination or subset of these ranges. The thicknesses of different first layers 142 may be the same or different. In embodiments, each first layer 142 may have a thickness, such as a thickness according to Equation 1, that promotes confinement of the optical signal in hollow core 110 through an anti-resonant effect. Without being bound by theory, when each first layer 142 has a thickness that provides confinement through an anti-resonant effect, attenuation of an optical signal passing through the hollow-core optical fiber 100 may be reduced.

In embodiments, each second layer 144 may have a thickness from 1 μm to 20 μm. For example, without limitation, each second layer 144 may have a thickness from 1 μm to 20 μm, from 5 μm to 20 μm, from 10 μm to 20 μm, from 15 μm to 20 μm, from 1 μm to 15 μm, from 1 μm to 10 μm, from 1 μm to 5 μm, or any combination or subset of these ranges. The thickness of a second layer 144 refers to the distance between the inner surface 147 of a first layer 142 forming an outer boundary of the second layer 144 and the respective outer surface 148 of an adjacent first layer 142 forming an inner boundary of the second layer 144. For example, without limitation, the thickness of second layer 144*b* is the distance between inner surface 147*a* of first layer 142*a* and outer surface 148*b* of first layer 142*b* in the embodiment depicted in FIG. 1. In embodiments, each second layer 144 comprises a gas, such as air. In embodiments, each second layer 144 comprises a gas and a glass. In embodiments, each second layer 144 comprises a gas and an interconnection element that interconnects first layers 142.

First layers 142 are interconnected by interconnection elements. Interconnection elements include ribs and tubes. Still referring to FIG. 1, the first layers 142 of the Bragg structure may be interconnected by a plurality of ribs 150 (i.e., ribs 150*a*, 150*b*, 150*c*, 150*d*, 150*e*, 150*f*, 150*g*, 150*h*, 150*i*, 150*j*, 150*k*, and 150*l* in the embodiment depicted in FIG. 1) extending parallel to the central longitudinal axis 112 of the hollow-core optical fiber 100. The ribs 150 may be operable to support the first layers 142 of the Bragg structure. In embodiments, each rib 150 comprises silica-based glass. Each rib 150 may have a first surface 152 and a second surface 154. Each rib 150 may have a width from 0.1 μm to 5 μm. As described herein, the width of a rib 150 is the distance between first surface 152 and second surface 154. For example, without limitation, each rib 150 may have a width from 0.1 μm to 5 μm, from 0.1 μm to 4 μm, from 0.1 μm to 3 μm, from 0.1 μm to 2 μm, from 0.1 μm to 1 μm, from 1 μm to 5 μm, from 2 μm to 5 μm, from 3 μm to 5 μm, from 4 μm to 5 μm, or any combination or subset of these ranges. The widths of different ribs 150 may be the same or different. In embodiments, each rib 150 may have a length that extends parallel to the central longitudinal axis 112 of the hollow-core optical fiber 100 for the length of the hollow-core optical fiber 100. In embodiments, each rib 150 may have a length that extends less that the length of the hollow-core optical fiber 100 in a direction parallel to the central longitudinal axis 112. In embodiments, each rib 150 may have a height h that is equal to the thickness of each second layer 144. The ribs 150 are positioned at discrete locations in a circumferential direction about central longitudinal axis 112.

In embodiments, the ribs 150 directly contacting an inner surface 147 of a first layer 142 of the first cladding 122 and ribs 150 directly contacting an outer surface 148 of the same first layer 142 of the first cladding 122 do not lie on the same radius of the hollow-core optical fiber 100. As described herein, "radius" refers to a line extending from the central longitudinal axis 112 to the inner surface 132 of substrate 130 of the hollow core optical fiber 100. For example, in the embodiment depicted in FIG. 1, rib 150*b* directly contacts inner surface 147*a* of first layer 142*a* and rib 150*d* directly contacts outer surface 148*a* of first layer 142*a*. Rib 150*b* and rib 150*d* do not lie on the same radius of hollow-core optical fiber 100. Without intending to be bound by theory, when ribs contacting an inner surface and an outer surface of a first layer of the Bragg structure are positioned on the same radius of the hollow-core optical fiber, light may be transmitted radially through the ribs and away from the hollow core. Positioning the ribs contacting the inner and outer surfaces of a first layer of the Bragg structure so they are not on a common radius of the hollow-core optical fiber may reduce attenuation of an optical signal passing through the hollow-core optical fiber.

In embodiments, ribs 150 directly contacting outer surfaces 148 of alternate first layers 142 may be positioned on a common radius of the hollow-core optical fiber 100. For example, in the embodiment depicted in FIG. 1, first layer 142*d* and first layer 142*b* are alternate first layers. Rib 150*a* directly contacts the outer surface 148*d* of first layer 142*d*, and rib 150*b* directly contacts the outer surface 148*b* of first layer 142*b*. Rib 150*a* and rib 150*b* are on a common radius of hollow-core optical fiber 100.

In embodiments, the ribs 150 may be positioned on radii of the hollow-core optical fiber 100 that do not pass through the plurality of cladding elements 170 of the second cladding 124. For example, in the embodiment depicted in FIG. 1, rib 150*a* and rib 150*b* are positioned on a radius of the hollow-core optical fiber 100 that passes through a gap between cladding element 170*a* and cladding element 170*f*.

In embodiments, each first layer 142 of the Bragg structure is connected to another first layer 142 by from 2 to 8 ribs 150. For example, without limitation, each first layer 142 of the Bragg structure may be connected to another first layer 142 by 2, 3, 4, 5, 6, 7, or even 8 ribs 150. In the embodiment depicted in FIG. 1, each first layer 142 is connected to another first layer 142 by three ribs 150. In embodiments, the ribs 150 connecting a first layer 142 to an adjacent first layer 142 are equally spaced about the central longitudinal axis 112 in a circumferential direction. In the embodiment depicted in FIG. 1, the three ribs 150 connecting adjacent first layers 142 are equally spaced by 120 degrees in a circumferential direction about central longitudinal axis 112.

While FIG. 1 depicts the first layers 142 of the Bragg structure connected by ribs, it should be understood that other embodiments are contemplated and possible. Now referring to FIG. 2 by way of example, in embodiments, the first layers 142 of the Bragg structure may be interconnected by a plurality of tubes 250 (i.e., tubes 250*a*, 250*b*, 250*c*, 250*d*, 250*e*, 250*f*, 250*g*, 250*h*, 250*i*, 250*j*, 250*k*, and 250*l* in the embodiment of FIG. 2) extending parallel to the central longitudinal axis 112 of the hollow-core optical fiber 100 as an alternative to ribs. The tubes 250 may be operable to support the first layers 142 of the Bragg structure. In embodiments, each tube 250 comprises glass. In one embodiment, the glass is silica-based glass. In embodiments, the tubes may have a circular, elliptical, oval, or any other suitable cross sectional shape. Without intending to be bound by theory, when the tubes 250 have a circular, elliptical, oval, or similar cross sectional shape, a convex surface of a tube 250 may be facing the hollow core 110 of the hollow-core optical fiber 100. This negative curvature may facilitate an inhibited coupling mechanism to reduce attenuation of an optical signal passing through the hollow-core optical fiber 100.

Each tube 250 may have an outer diameter from 1 μm to 20 μm. For example, without limitation, each tube 250 may have an outer diameter from 1 μm to 20 μm, from 5 μm to 20 μm, from 10 μm to 20 μm, from 15 μm to 20 μm, from 1 μm to 15 μm, from 1 μm to 10 μm, from 1 μm to 5 μm, or any combination or subset of these ranges. In embodiments, each tube 250 may have substantially the same outer diameter. In embodiments, each tube 250 may have an outer diameter that is equal to the thickness of each second layer 144. In embodiments, each tube 250 may have a length that extends parallel to the central longitudinal axis 112 of the hollow-core optical fiber 100 for the length of the hollow-core optical fiber 100. In embodiments, each tube 250 may have a length that extends parallel to the central longitudinal axis 112 of the hollow-core optical fiber 100 for less than the length of the hollow-core optical fiber 100.

In embodiments, each tube 250 has an inner surface 252 and an outer surface 254. Each tube 250 may have a wall thickness from 0.1 μm to 5 μm. For example, without limitation, each tube 250 may have a wall thickness from 0.1 μm to 5 μm, from 1 μm to 5 μm, from 2 μm to 5 μm, from 3 μm to 5 μm, from 4 μm to 5 μm, from 0.1 μm to 4 μm, from 0.1 μm to 3 μm, from 0.1 μm to 2 μm, from 0.1 μm to 1 μm, or any combination or sub-set of these ranges. Wall thickness of the tubes 250 refers to the distance between the inner surface 252 and the outer surface 254 of the respective tubes 250. In embodiments, each tube may have a wall thickness, such as a wall thickness according to Equation 1, that provides confinement of an optical signal in hollow core 110 through an anti-resonant effect. Without intending to be bound by theory, when each tube 250 has a wall thickness that provides confinement of an optical signal in hollow core 110 through the anti-resonant effect, attenuation of an optical signal passing through the hollow-core optical fiber 100 may be reduced.

In embodiments, the tubes 250 directly contacting an inner surface 147 of a first layer 142 and the tubes directly contacting an outer surface 148 of the same first layer 142 do not lie on the same radius of the hollow-core optical fiber 100. For example, in the embodiment depicted in FIG. 2, tube 250*b* directly contacts inner surface 147*a* of first layer 142*a* and tube 250*d* directly contacts outer surface 148*a* of first layer 142*a*. Tube 250*b* and tube 250*d* do not lie on the same radius of hollow-core optical fiber 100.

Figure 2:
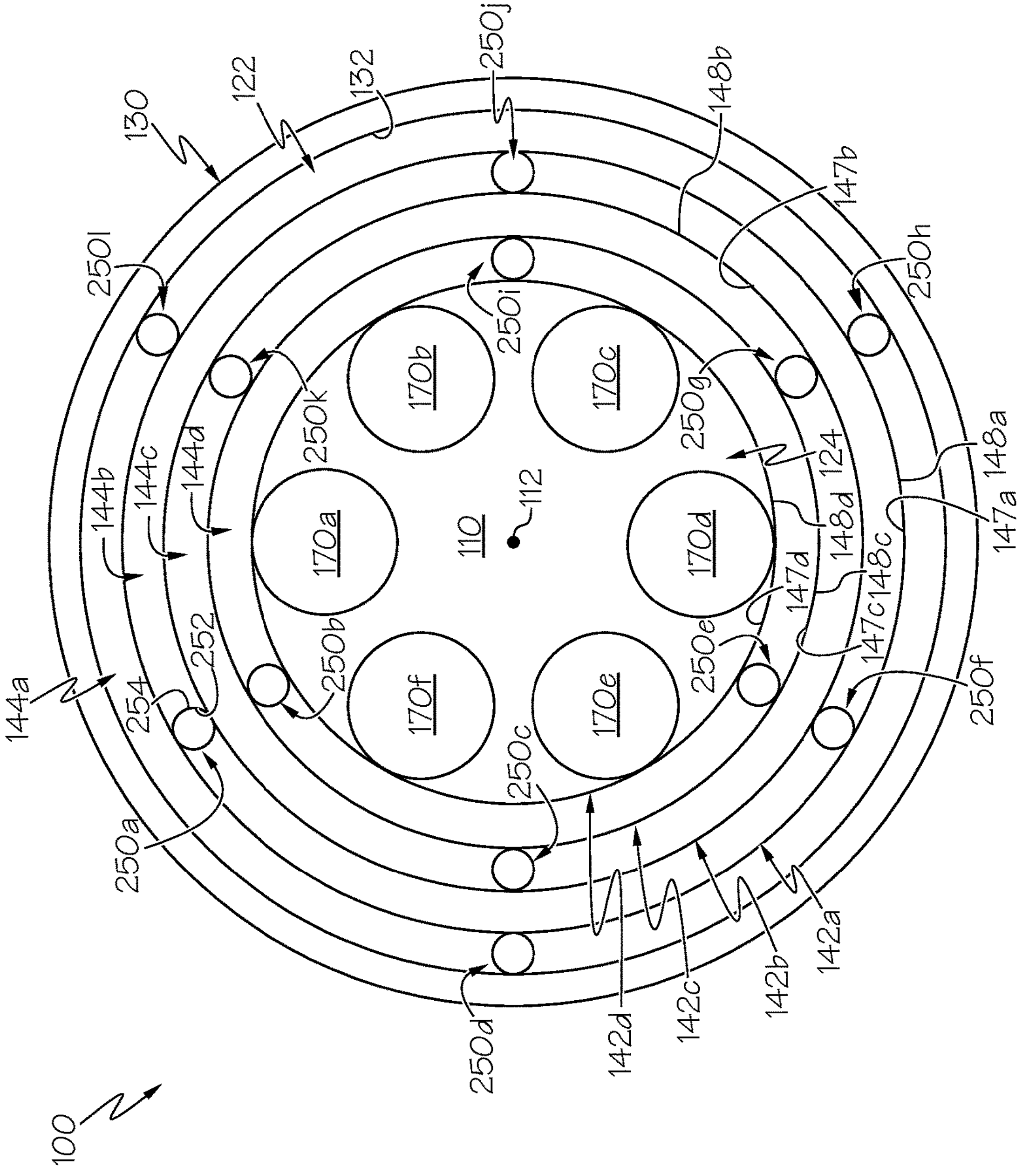
FIG. 2 schematically depicts a cross-sectional view of a hollow-core optical fiber according to one or more embodiments described herein.

In embodiments, tubes 250 directly contacting outer surfaces 148 of alternate first layers 142 are positioned on a common radius of the hollow-core optical fiber 100. For example, in the embodiment depicted in FIG. 2, first layer 142*d* and first layer 142*b* are alternate first layers. Tube 250*b* directly contacts the outer surface 148*b* of first layer 142*b*, and tube 250*a* directly contacts the outer surface 148*d* of first layer 142*d*. As depicted in FIG. 2, tube 250*a* and tube 250*b* are on a common radius of hollow-core optical fiber 100.

In embodiments, the tubes 250 are positioned on radii of the hollow-core optical fiber 100 that do not pass through the plurality of cladding elements 170. For example, in the embodiment depicted in FIG. 2, tube 250*a* and tube 250*b* are positioned on a radius of the hollow-core optical fiber 100 that passes through a gap between cladding element 170*a* and 170*f*. In such embodiments, the tubes 250 may be operable to confine light to the hollow core by an inhibited coupling mechanism or anti-resonant effects, particularly light that passes through the gaps between cladding elements 170. However, it should be noted that the light confinement characteristics of the tubes 250 are secondary to the structural support characteristics of the tubes 250.

In embodiments, each first layer 142 of the Bragg structure may be connected to another first layer 142 by from 2 to 8 tubes 250. For example, without limitation, each first layer 142 of the Bragg structure may be connected to another first layer 142 by 2, 3, 4, 5, 6, 7, or even 8 tubes 250. In the embodiment depicted in FIG. 2, each first layer 142 is connected to another first layer 142 by three tubes 250. In embodiments, the tubes 250 connecting a first layer 142 to an adjacent first layer 142 are equally spaced about the central longitudinal axis 112 in a circumferential direction. In the embodiment depicted in FIG. 2, the three tubes 250 connecting adjacent first layers 142 are equally spaced by 120 degrees in a circumferential direction about central longitudinal axis 112.

Referring again to FIG. 1, in embodiments, the second cladding 124 comprises from 3 to 8 cladding elements 170. For example, without limitation, the second cladding 124 may comprise 3, 4, 5, 6, 7, or even 8 cladding elements 170. In embodiments, the second cladding 124 may comprise 5 or 6 cladding elements 170. For example, the embodiment depicted in FIG. 1 includes 6 cladding elements 170 in the second cladding 124. In embodiments, each cladding element 170 comprises silica-based glass.

Each cladding element 170 may be spaced apart from adjacent cladding elements 170 in a circumferential direction 190 about central longitudinal axis 112. That is, each cladding element 170 in the second cladding 124 may not be in direct contact with another cladding element 170 in the plurality of cladding elements 170. For example, according to the embodiment depicted in FIG. 1, cladding element 170*a* and cladding element 170*f* are spaced apart in a circumferential direction 190 such that cladding element 170*a* and cladding element 170*f* are not in direct contact with each other. Without intending to be bound by theory, when cladding elements 170 are in direct contact, the points at which the cladding elements 170 are in direct contact may have a thickness that is outside the range of thicknesses that promote confinement of an optical signal in hollow core 110 through the anti-resonant effect. Accordingly, direct contact between cladding elements 170 may reduce the confinement of light in the hollow core 110 of the hollow-core optical fiber 100. In embodiments, cladding elements 170 are equally spaced about the central longitudinal axis 112 in a circumferential direction. In the embodiment depicted in FIG. 1, the six cladding elements 170 are equally spaced by 60 degrees in a circumferential direction.

Each cladding element 170 may be spaced apart from adjacent cladding elements 170 by a distance of less than or equal to 6 μm without contacting. As described herein, the distance by which two adjacent cladding elements are spaced apart is the shortest distance between the exterior surfaces of the adjacent cladding elements. For example, without limitation, each cladding element 170 may be spaced apart from adjacent cladding elements 170 by a distance of less than or equal to 6 μm, 5 μm, 4 μm, 3 μm, 2 μm, or 1 μm, without contacting. Without intending to be bound by theory, reducing the distance between the cladding elements 170 may reduce attenuation of an optical signal passing through the hollow-core optical fiber 100. If the distance between the cladding elements 170 is too large (i.e., greater than 6 μm) light may leak out of the hollow core 110 through the gaps between the cladding elements 170, reducing the strength of the optical signal. Positioning the cladding elements 170 so the distance between the cladding elements 170 is less than or equal to 6 μm, without contacting, may minimize such losses.

In embodiments, each cladding element 170 may be directly connected to an inner surface 147 of a first layer 142 of the Bragg structure. For example, cladding element 170*a* directly contacts the inner surface 147*d* of first layer 142*d* of the Bragg structure in the embodiment depicted in FIG. 1.

Still referring to FIG. 1, each cladding element 170 comprises a cladding element central longitudinal axis 172 (i.e., cladding element central longitudinal axis 172*a*, 172*b*, 172*c*, 172*d*, 172*e*, and 172*f* in the embodiment depicted in FIG. 1). In embodiments, each cladding element central longitudinal axis 172 may be parallel to the central longitudinal axis 112 of the hollow-core optical fiber 100. In embodiments, each cladding element central longitudinal axis 172 may be parallel to each of the other cladding element central longitudinal axes 172. In embodiments, each cladding element central longitudinal axis 172 may be positioned on the circumference of a circle that is perpendicular to and centered on the central longitudinal axis 112 of the hollow-core optical fiber 100. In such embodiments, it should be understood that each cladding element central longitudinal axis 172 is equidistant from the central longitudinal axis 112 of the hollow-core optical fiber 100.

In embodiments, each cladding element 170 may be formed as a capillary, as depicted in FIG. 1. Each capillary may extend in a direction parallel to the central longitudinal axis 112 of the hollow-core optical fiber 100. Each capillary may comprise an inner surface 174 (i.e., inner surface 174*a*, 174*b*, 174*c*, 174*d*, 174*e*, and 174*f* in the embodiment depicted in FIG. 1) and an outer surface 176 (i.e., outer surface 176*a*, 176*b*, 176*c*, 176*d*, 176*e*, and 176*f* in the embodiment depicted in FIG. 1). The inner surface 174 of each capillary defines a cavity that may be occupied solely by a gas. It should be understood that capillaries generally may have a tubular shape. In embodiments, the capillaries may have a circular, elliptical, oval, or any other suitable cross sectional shape. In embodiments, the capillaries have a circular cross sectional shape. When the capillaries have a circular, elliptical, oval, or similar cross sectional shape, a convex surface of the capillary may be facing the hollow core 110 of the hollow-core optical fiber 100. Without intending to be bound by theory, this negative curvature may facilitate an inhibited coupling mechanism to reduce attenuation of an optical signal passing through the hollow-core optical fiber 100.

In embodiments, each capillary may have an inner diameter from 12 μm to 50 μm. For example, without limitation, each capillary may have an inner diameter from 12 μm to 50 μm, from 16 μm to 50 μm, from 20 μm to 50 μm, from 24 μm to 50 μm, from 28 μm to 50 μm, from 32 μm to 50 μm, from 36 μm to 50 μm, from 40 μm to 50 μm, from 44 μm to 50 μm, from 48 μm to 50 μm, from 12 μm to 46 μm, 12 μm to 42 μm, from 12 μm to 38 μm, from 12 μm to 34 μm, from 12 μm to 30 μm, from 12 μm to 26 μm, from 12 μm to 22 μm, from 12 μm to 18 μm, from 12 μm to 16 μm, or any combination or sub-set of these ranges. In embodiments, each capillary may have the same inner diameter.

In embodiments, each capillary may have a wall thickness from 0.1 μm to 4.0 μm. As described herein, wall thickness refers to the distance between the inner surface 174 of the capillary and the outer surface 176 of the capillary. For example, without limitation, each capillary may have a wall thickness from 0.1 μm to 4.0 μm, from 0.5 μm to 4.0 μm, from 1 μm to 4.0 μm, from 1.5 μm to 4.0 μm, from 2.0 μm to 4.0 μm, from 2.5 μm to 4.0 μm, from 3.0 μm to 4.0 μm, from 3.5 μm to 4.0 μm, 0.1 μm to 3.5 μm, 0.1 μm to 3.0 μm, 0.1 μm to 2.5 μm, 0.1 μm to 2.0 μm, 0.1 μm to 1.5 μm, 0.1 μm to 1.0 μm, 0.1 μm to 0.5 μm, or any combination or sub-set of these ranges. In embodiments, each capillary may have the same wall thickness. In embodiments, each capillary may have a thickness, such as a thickness according to Equation 1, that promotes confinement of the optical signal in hollow core 110 through an anti-resonant effect. Without intending to be bound by theory, when each capillary has a wall thickness that provides an anti-resonant effect, attenuation of an optical signal passing through the hollow-core optical fiber 100 may be reduced.

Figure 3:
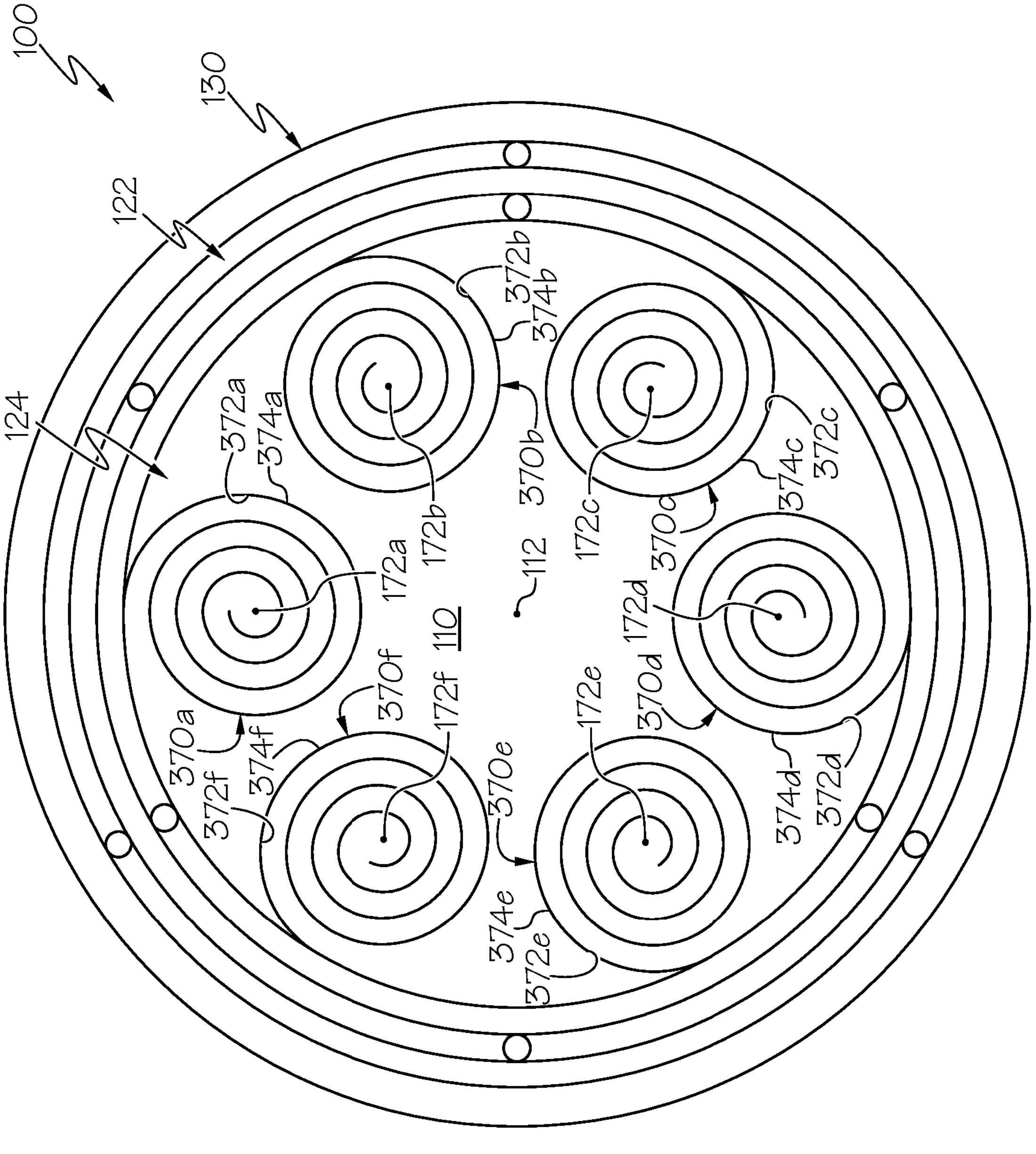
FIG. 3 schematically depicts a cross-sectional view of a hollow-core optical fiber according to one or more embodiments described herein.

While FIGS. 1 and 2 depict hollow-core optical fibers having tubular cladding elements 170, it should be understood that other configurations of cladding elements 170 are contemplated and possible. Referring now to FIG. 3 by way of example, each of the cladding elements 370 (i.e., cladding elements 370*a*, 370*b*, 370*c*, 370*d*, 370*e*, and 370*f* in the embodiment of FIG. 3) comprises a glass sheet configured as a spiral. Each glass sheet configured as a spiral may extend in a direction parallel to the central longitudinal axis 112 of the hollow-core optical fiber 100. Each glass sheet may have an inner surface 372 (i.e., inner surface 372*a*, 372*b*, 372*c*, 372*d*, 372*e*, and 372*f* in the embodiment depicted in FIG. 3) and an outer surface 374 (i.e., outer surface 374*a*, 374*b*, 374*c*, 374*d*, 374*e*, and 374*f* in the embodiment depicted in FIG. 3).

In embodiments, each glass sheet configured as a spiral may have a thickness from 0.1 μm to 4.0 μm. As described herein, thickness of the glass sheet refers to the distance between inner surface 372 of the glass sheet and outer surface 374 of the glass sheet. For example, without limitation, glass sheet 380 may have a thickness from 0.1 μm to 4.0 μm, from 0.5 μm to 4.0 μm, from 1 μm to 4.0 μm, from 1.5 μm to 4.0 μm, from 2.0 μm to 4.0 μm, from 2.5 μm to 4.0 μm, from 3.0 μm to 4.0 μm, from 3.5 μm to 4.0 μm, 0.1 μm to 3.5 μm, 0.1 μm to 3.0 μm, 0.1 μm to 2.5 μm, 0.1 μm to 2.0 μm, 0.1 μm to 1.5 μm, 0.1 μm to 1.0 μm, 0.1 μm to 0.5 μm, or any combination or sub-set of these ranges. In embodiments, each glass sheet may have the same thickness. In embodiments, each glass sheet may have a thickness, such as a thickness according to Equation 1, that promotes confinement of the optical signal in hollow core 110 through an anti-resonant effect. Without intending to be bound by theory, when each glass sheet has a thickness that provides an anti-resonant effect, attenuation of an optical signal passing through the hollow-core optical fiber 100 may be reduced.

Each glass sheet configured as a spiral may comprise from 2 to 12 turns. As described herein, a turn refers to a single revolution of the glass sheet around a central axis. For example, glass sheet 370 comprises 4 turns around cladding element central longitudinal axis 172 in the embodiment depicted in FIG. 3. For example, without limitation, each glass sheet configured as a spiral may comprise 2, 3, 4, 5, 6, 7, 8, 9, 10, 11, or even 12 turns. Without intending to be bound by theory, as the number of turns in the spiral increases the number of convex surfaces facing the hollow core of the fiber also increases. This may improve the ability of the spiral confine an optical signal to the hollow core of the fiber by an inhibited coupling mechanism. Additionally, as the number of turns in the spiral increases, the number of layers having a thickness that satisfies the anti-resonant effect increases. This may improve the ability of the spiral to confine an optical signal to the hollow core of the fiber by the anti-resonant effect.

In embodiments, the hollow core 110 may comprise one or more gasses. In embodiments, the hollow core 110 may comprise one or more inert gasses. In embodiments, the hollow core 110 may comprise, consist essentially of, or consist of air.

In embodiments described herein, the first cladding 122 and the second cladding 124 may be configured to confine a fundamental mode of an optical signal (i.e., light) propagating in the hollow core 110 of the hollow-core optical fiber 100 by one or more of the anti-resonant effect, an inhibited coupling mechanism, and a photonic bandgap effect. In embodiments, the fundamental mode of the optical signal guided by the hollow core 110 may have a wavelength λ from 350 nm to 8000 nm. For example, without limitation, the fundamental mode of the optical signal guided by hollow core 110 may have a wavelength from 350 nm to 8000 nm, from 500 nm to 8000 nm, from 1000 nm to 8000 nm, from 1500 nm to 8000 nm, from 2000 nm to 8000 nm, from 2500 nm to 8000 nm, from 3000 nm to 8000 nm, from 3500 nm to 8000 nm, from 4000 nm to 8000 nm, from 4500 nm to 8000 nm, from 5000 nm to 8000 nm, from 5500 nm to 8000 nm, from 6000 nm to 8000 nm, from 6500 nm to 8000 nm, from 7000 nm to 8000 nm, from 7500 nm to 8000 nm, from 350 nm to 7500 nm, from 350 nm to 7000 nm, from 350 nm to 6500 nm, from 350 nm to 6000 nm, from 350 nm to 5500 nm, from 350 nm to 5000 nm, from 350 nm to 4500 nm, from 350 nm to 4000 nm, from 350 nm to 3500 nm, from 350 nm to 3000 nm, from 350 nm to 2500 nm, from 350 nm to 2000 nm, from 350 nm to 1500 nm, from 350 nm to 1000 nm, from 350 nm to 500 nm, or any combination or subset of these ranges. In embodiments, the wavelength λ may be from 1300 nm to 1600 nm. In embodiments, the first cladding 122 may be configured to provide one or both of a photonic bandgap effect and an anti-resonant effect at a wavelength from 350 nm to 8000 nm, the photonic bandgap effect and anti-resonant effect operable to confine an optical signal propagating in the hollow-core optical fiber 100 at a wavelength from 350 nm to 8000 nm, in the hollow core 110. In embodiments, the second cladding 124 may be configured to provide an anti-resonant effect and/or an inhibited coupling mechanism at a wavelength from 350 nm to 8000 nm, the anti-resonant effect and/or inhibited coupling mechanism operable to confine an optical signal propagating in the hollow-core optical fiber 100 at a wavelength from 350 nm to 8000 nm in the hollow core 110.

Without intending to be bound by theory, confinement loss may be the dominant attenuation factor in the hollow-core optical fibers described herein. Confinement loss may occur as light leaks from the hollow core 110 to the cladding 130. Confinement loss may be calculated using Equation 2 and Equation 3.

$$n_{eff} = n_r + i \cdot n_{im} \quad \text{Equation 2}$$

$$CL\left[\frac{\text{dB}}{\text{km}}\right] = \frac{20}{\ln(10)} \cdot \frac{2\pi}{\lambda} \cdot \text{Im}(n_{eff}) \cdot 10^3 \quad \text{Equation 3}$$

In Equations 2 and 3, $n_{eff}$ is the effective index of the mode propagating in the hollow-core fiber with the real part of $n_r$ and the imaginary part of $n_{im}$. The real part of the effective index is related to the propagation speed of the mode and the imaginary part is related to the confinement loss of the mode. For an anti-resonant hollow core fiber with a given structure of the core and the cladding, the effective index may be determined using a fiber modeling tool, such COMSOL Multiphysics®. The confinement loss is calculated using Equation 3.

In embodiments, the first cladding 122 and the second cladding 124 are configured such that a minimum confinement loss of a fundamental mode of the optical signal propagating in the hollow-core optical fiber 100 is less than $10^{-2}$ dB/km at the wavelength λ of the fundamental mode guided by hollow core 110. For example, without limitation, the first cladding 122 and the second cladding 124 are configured such that a confinement loss of a fundamental mode of the optical signal propagating in the hollow core 110 of hollow-core optical fiber 100 at a wavelength λ may be less than $10^{-2}$ dB/km, less than $10^{-3}$ dB/km, less than $10^{-4}$ dB/km, or even less than $10^{-5}$ dB/km.

Embodiments of the hollow-core optical fibers described herein may be made by the following method. The cladding elements, such as the first cladding and the second cladding, may be sleeved into a substrate in a desired arrangement. The cladding elements may be joined to the substrate and to each other, as desired, to form a preform assembly. The cladding elements and substrate may be joined by any suitable means, such as, but not limited to setting against, pressing, heating, fusing, welding, and adhesives. Techniques for welding include laser welding, flame welding, and plasma welding. The preform assembly may be redrawn into a fiber preform using conventional fiber redraw techniques. The fiber preform may then be drawn into optical fiber using conventional fiber drawing techniques.

EXAMPLES

The embodiments described herein will be further clarified by the following examples.

Figure 4:
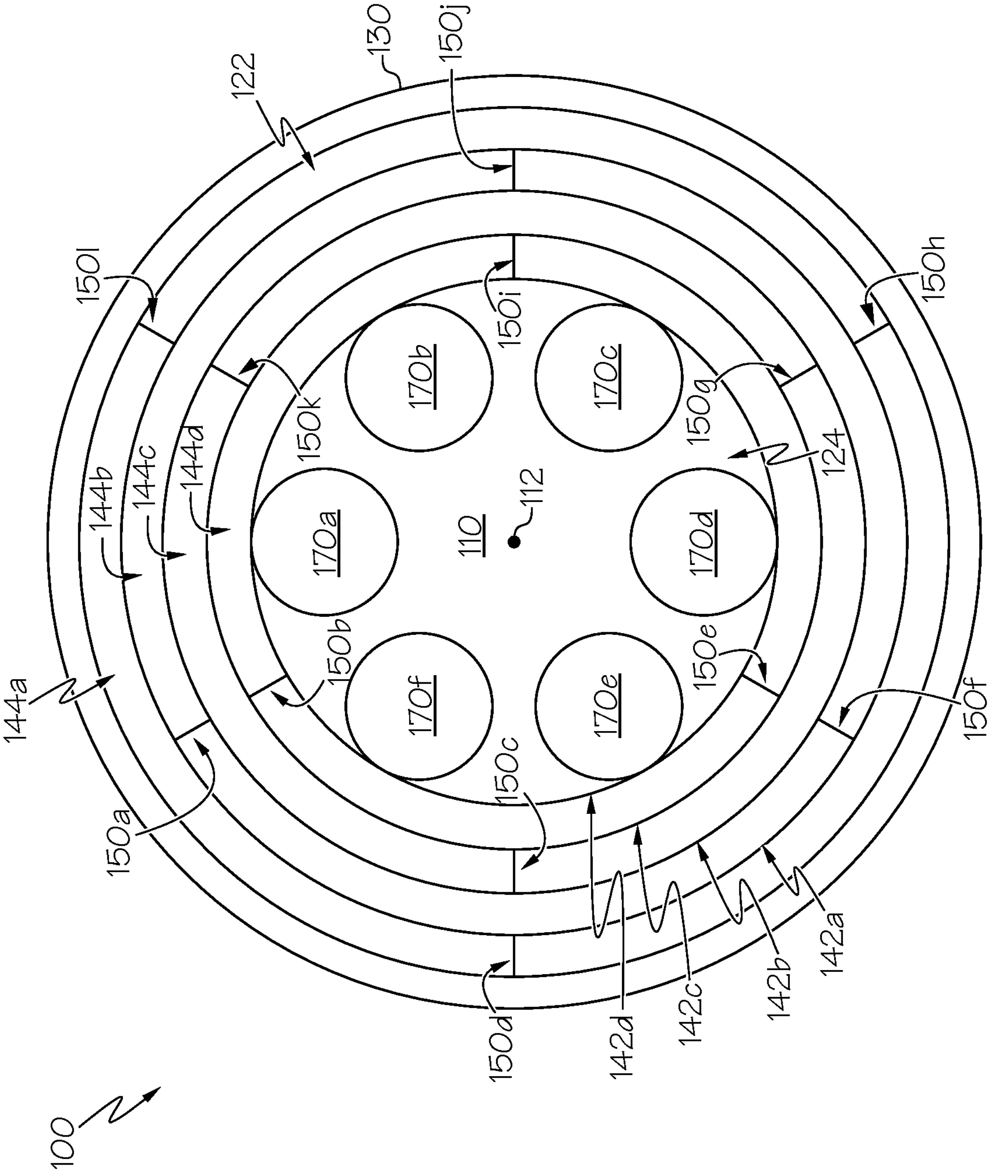
FIG. 4 schematically depicts a cross-sectional view of a hollow-core optical fiber according to the embodiment of Example 1.

Example 1—Modeling Confinement Loss of a Hollow-Core Optical Fiber as a Function of Wavelength A hollow-core optical fiber 100 having a first cladding 122 and a second cladding 124 was modeled to determine the confinement loss of the fiber as a function of wavelength. A cross section of the modeled hollow-core optical fiber 100 of Example 1 is depicted in FIG. 4. The first cladding 122 included a Bragg structure having four first layers 142*a*, 142*b*, 142*c*, and 142*d* and four second layers 144*a*, 144*b*, 144*c*, and 144*d*. Each first layer 142 was silica-based glass. Each second layer 144 was air. Each first layer 142 had a thickness of 0.5 μm. The inner diameter of first layer 142*d* was 70 μm. Each second layer 144 had a thickness of 5 μm. Each first layer 142 was supported by three ribs 150 (i.e., ribs 150*a*, 150*b*, 150*c*, 150*d*, 150*e*, 150*f*, 150*g*, 150*h*, 150*i*, 150*j*, 150*k*, and 150*l* in the embodiment depicted in FIG. 4). Each rib 150 had a height of 5 μm and a thickness of 0.3 μm. The ribs supporting each first layer 142 were equally spaced in a circumferential direction about central longitudinal axis 112. The second cladding 124 includes six capillaries 170*a*, 170*b*, 170*c*, 170*d*, 170*e*, and 170*f*. Each capillary 170 had an inner diameter of 20 μm and a wall thickness of 0.5 μm. Each rib 150 was positioned on a radius of the hollow-core optical fiber 100 that did not pass through a capillary 170. The hollow core 110 had a diameter of 30 μm. As shown in FIG. 4, the structure of second cladding 124 of the hollow-core optical fiber 100 was symmetric with a 60° rotational symmetry or six repetitions.

Figure 5:
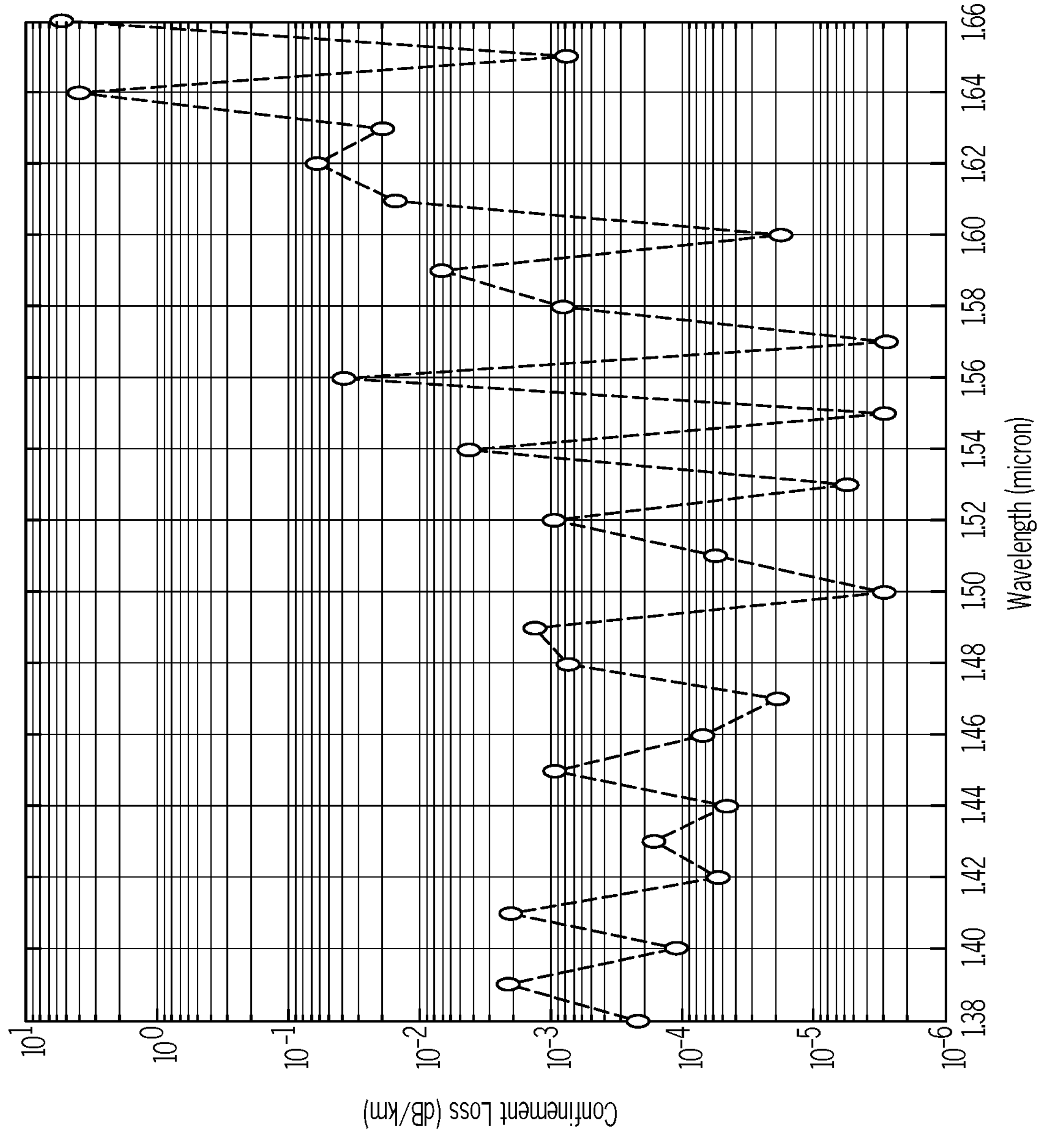
FIG. 5 graphically depicts confinement loss of the hollow-core optical fiber of Example 1 as a function of wavelength.

The confinement loss of the optical fiber was modeled using Comsol Multiphysics modeling software over wavelengths ranging from 1380 nm to 1660 nm. The Comsol Multiphysics modeling software modeled the confinement loss of the optical fiber using Equations (2) and (3) described herein. The results are shown in FIG. 5. According to the model, the hollow-core optical fiber 100 of Example 1 provided good confinement of the fundamental mode of an optical signal to the hollow core 110 of the fiber. In particular, the minimum confinement loss was about $2\times10^{-6}$ dB/km, which occurred at several wavelengths between 1500 nm and 1580 nm.

Figure 6:
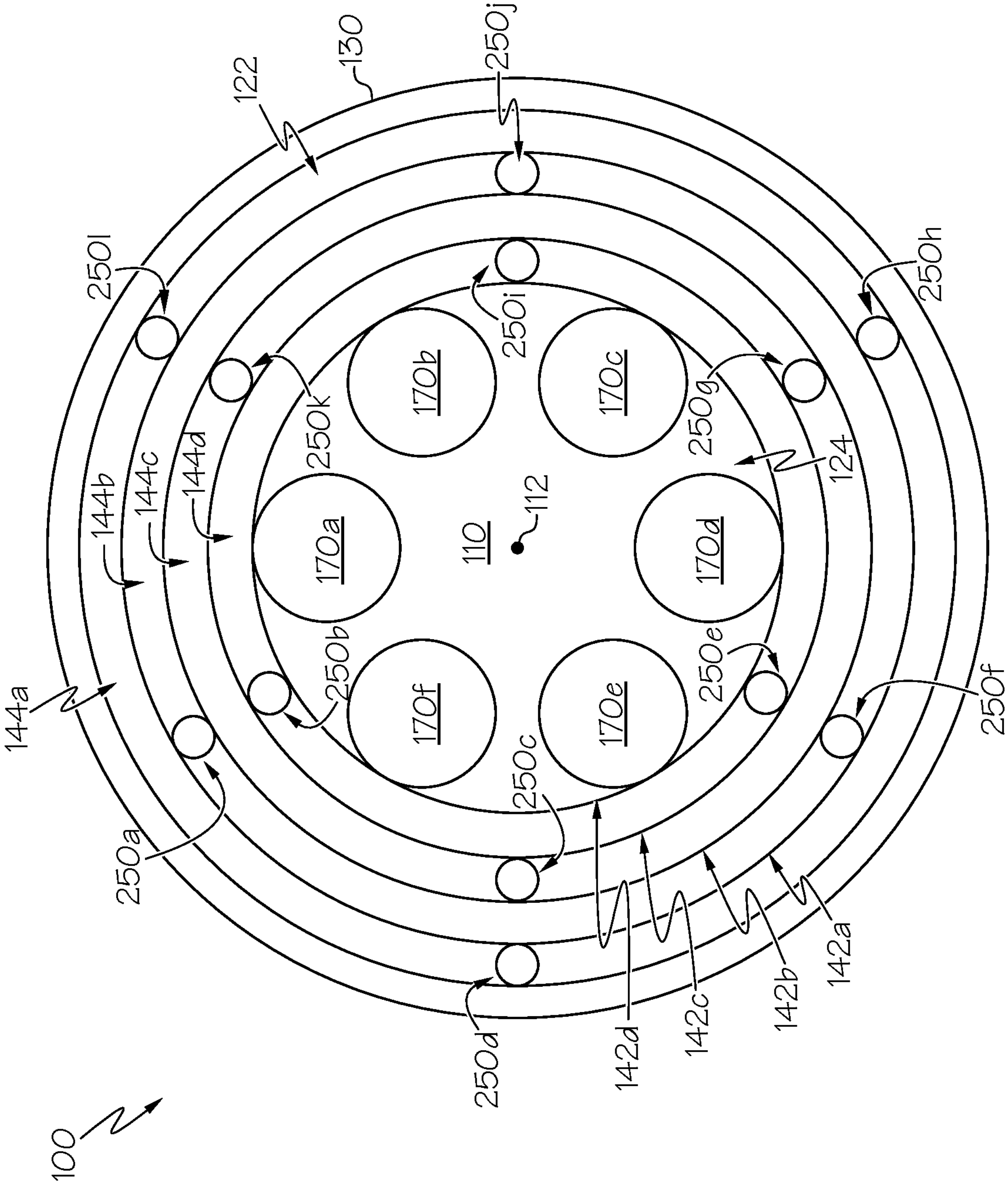
FIG. 6 schematically depicts a cross-sectional view of a hollow-core optical fiber according to the embodiment of Example 2.

Example 2—Modeling Confinement Loss of a Hollow-Core Optical Fiber as a Function of Wavelength A hollow-core optical fiber 100 having a first cladding 122 and a second cladding 124 was modeled to determine the confinement loss of the fiber as a function of wavelength. A cross section of the modeled hollow-core optical fiber 100 of Example 2 is depicted in FIG. 6. The first cladding 122 included a Bragg structure having four first layers 142*a*, 142*b*, 142*c*, and 142*d* and four second layers 144*a*, 144*b*, 144*c*, and 144*d*. Each first layer 142 was silica-based glass. Each second layer 144 was air. Each first layer 142 had a thickness of 0.5 μm. The inner diameter of first layer 142*d* was 70 μm. Each second layer 144 had a thickness of 6 μm. Each first layer 142 was supported by three tubes 250 (i.e., tubes 250*a*, 250*b*, 250*c*, 250*d*, 250*e*, 250*f*, 250*g*, 250*h*, 250*i*, 250*j*, 250*k*, and 250*l* in the embodiment of FIG. 6). The tubes 250 supporting each first layer 142 were equally spaced in a circumferential direction about central longitudinal axis 112. Each tube 250 had an outer diameter of 6 μm and a wall thickness of 0.3 μm. The second cladding 124 included six capillaries 170*a*, 170*b*, 170*c*, 170*d*, 170*e*, and 170*f*. Each capillary 170 had an outer diameter of 20 μm and a wall thickness of 0.5 μm. Each tube 250 was positioned on a radius of the hollow-core optical fiber 100 that did not pass through a capillary 170. The hollow core 110 had a diameter of 30 μm. As shown in FIG. 6, the structure of second cladding 124 of the hollow-core optical fiber 100 was symmetric with a 60° rotational symmetry or six repetitions.

Figure 7:
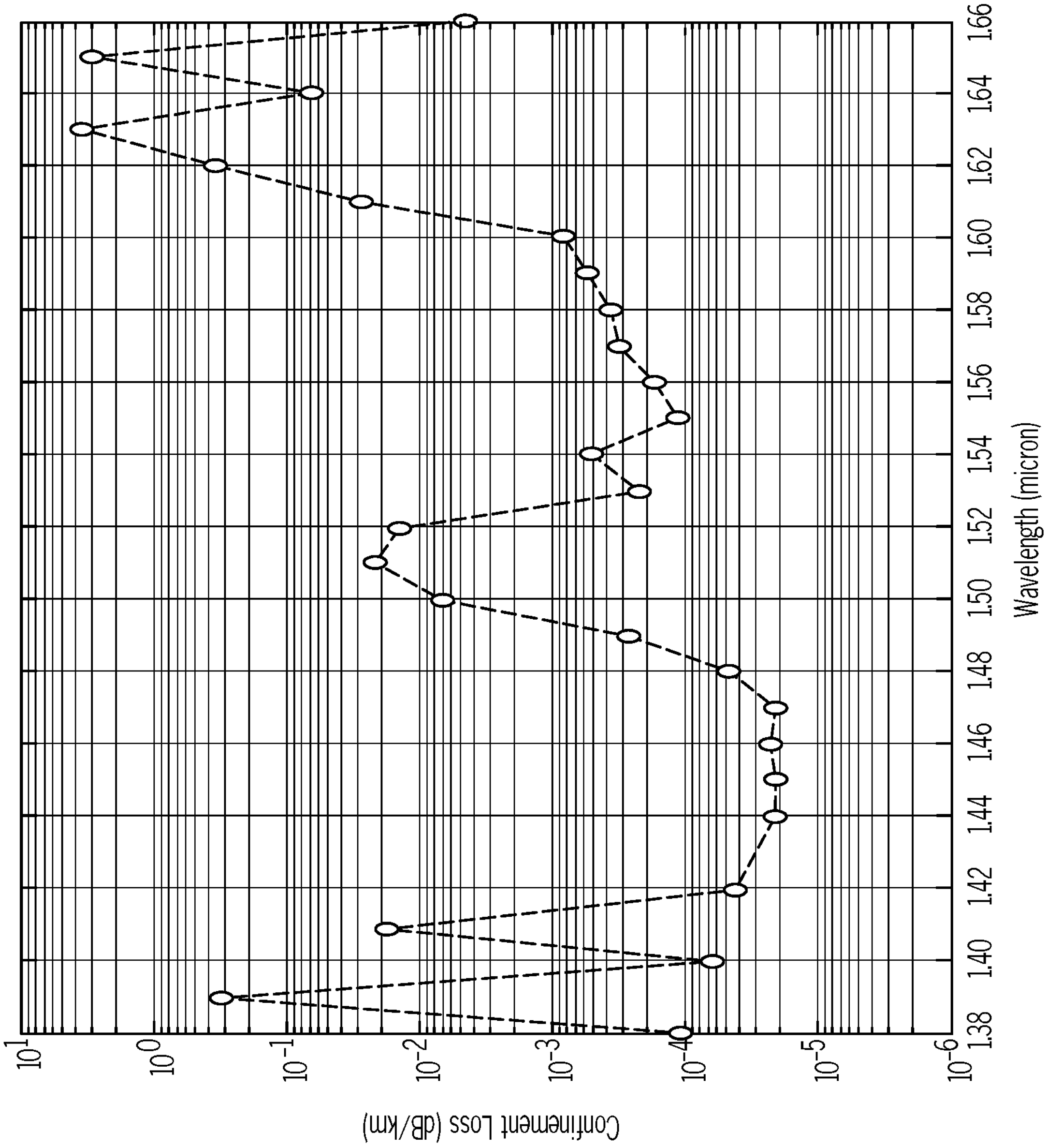
FIG. 7 graphically depicts confinement loss of the hollow-core optical fiber of Example 2 as a function of wavelength.

The confinement loss of the optical fiber was modeled using Comsol Multiphysics modeling software over wavelengths ranging from 1380 nm to 1660 nm. The results are shown in FIG. 7. According to the model, the hollow-core optical fiber 100 of Example 2 provided good confinement of the fundamental mode of an optical signal to the hollow core 110 of the fiber. In particular, the minimum confinement loss was about $2\times10^{-5}$ dB/km, which occurred at several wavelengths between 1420 nm and 1480 nm.

Figure 8:
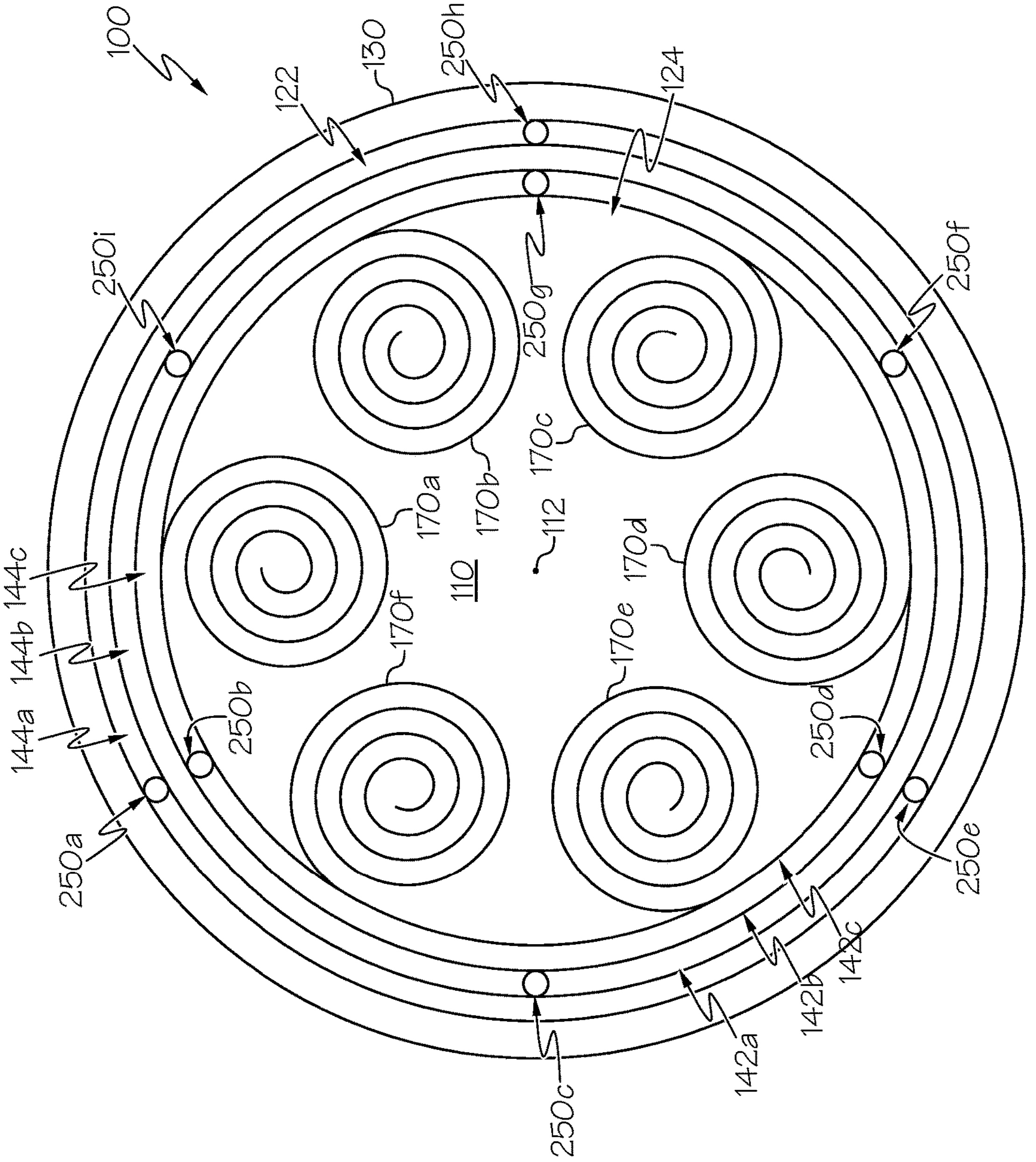
FIG. 8 schematically depicts a cross-sectional view of a hollow-core optical fiber according to the embodiment of Example 3.

Example 3—Modeling Confinement Loss of a Hollow-Core Optical Fiber as a Function of Wavelength A hollow-core optical fiber 100 having a first cladding 122 and a second cladding 124 was modeled to determine the confinement loss of the fiber as a function of wavelength. A cross section of the modeled hollow-core optical fiber 100 of Example 3 is depicted in FIG. 8. The first cladding 122 included a Bragg structure having three first layers 142*a*, 142*b*, and 142*c* and three second layers 144*a*, 144*b*, and 144*c*. Each first layer 142 was silica-based glass. Each second layer 144 was air. Each first layer 142 had a thickness of 0.5 μm. The inner diameter of first layer 142*c* was 72 μm. Each second layer 144 had a thickness of 2.4 μm. Each first layer 142 was supported by three tubes 250 (i.e., tubes 250*a*, 250*b*, 250*c*, 250*d*, 250*e*, 250*f*, 250*g*, 250*h*, and 250*i* in the embodiment of FIG. 8). The tubes 250 supporting each first layer 142 were equally spaced in a circumferential direction about central longitudinal axis 112. Each tube 250 had an inner diameter of 2.4 μm and a wall thickness of 0.5 μm. The second cladding 124 included six cladding elements 170*a*, 170*b*, 170*c*, 170*d*, 170*e*, and 170*f* configured as spirals. Each spiral included four turns. The wall thickness of each cladding element 170 was 0.5 μm. The gap between turns of the spiral was 2.0 μm, and the inner diameter of the spiral of the cladding element 170 was 6 μm. Each tube 250 was positioned on a radius of the hollow-core optical fiber 100 that did not pass through a cladding element 170. The hollow core 110 had a diameter of 30 μm. As shown in FIG. 8, the structure of second cladding 124 of the hollow-core optical fiber 100 was symmetric with a 60° rotational symmetry or six repetitions.

Figure 9:
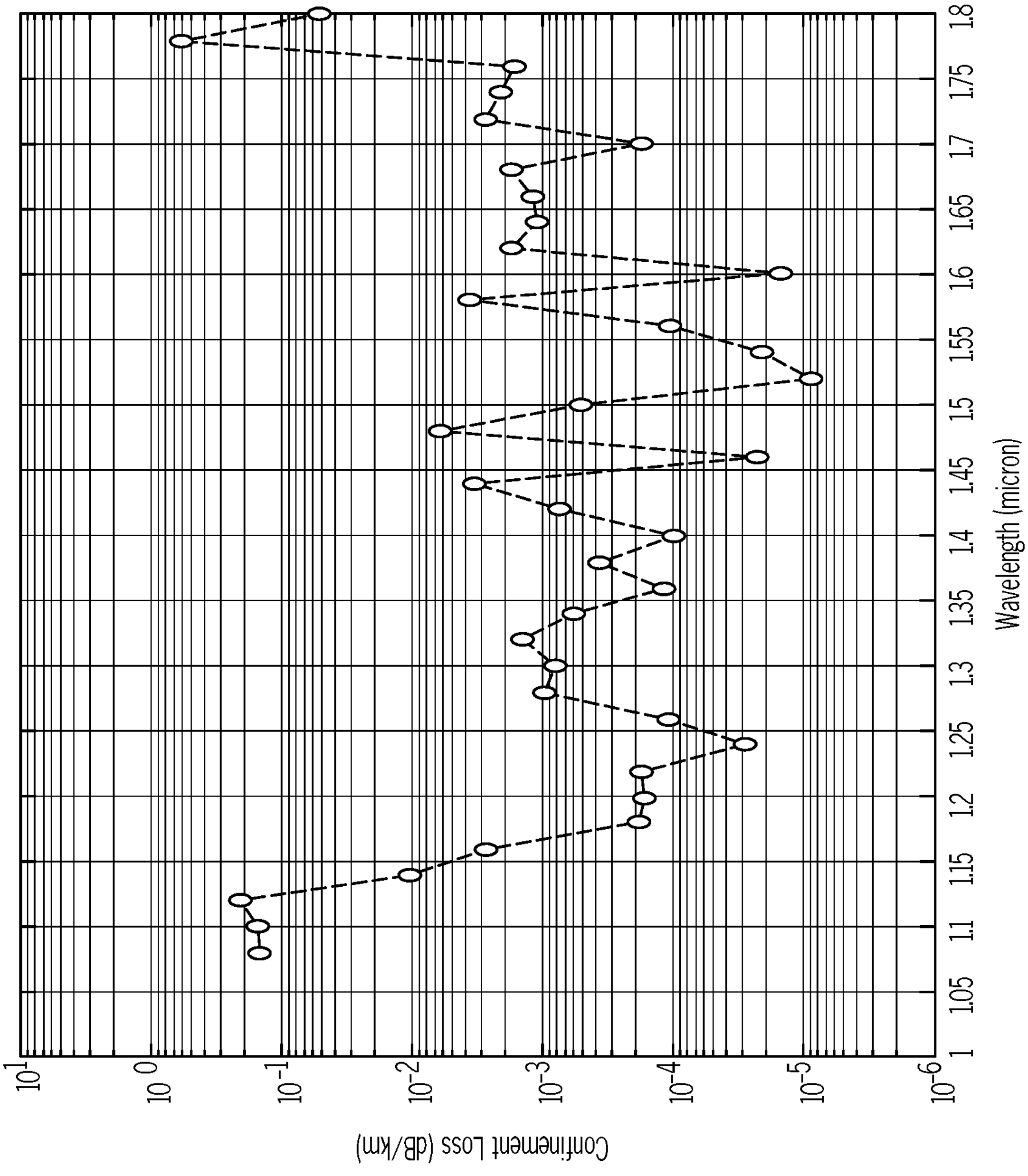
FIG. 9 graphically depicts confinement loss of the hollow-core optical fiber of Example 3 as a function of wavelength.

The confinement loss of the optical fiber was modeled using Comsol Multiphysics modeling software over wavelengths ranging from 1000 nm to 1800 nm. The results are shown in FIG. 9. According to the model, the hollow-core optical fiber 100 of Example 3 provided good confinement of the fundamental mode of the optical signal to the hollow core 110 of the fiber. In particular, the minimum confinement loss was about $2\times10^{-5}$ dB/km, which occurred at several wavelengths between 1200 nm and 1600 nm.

Figure 10:
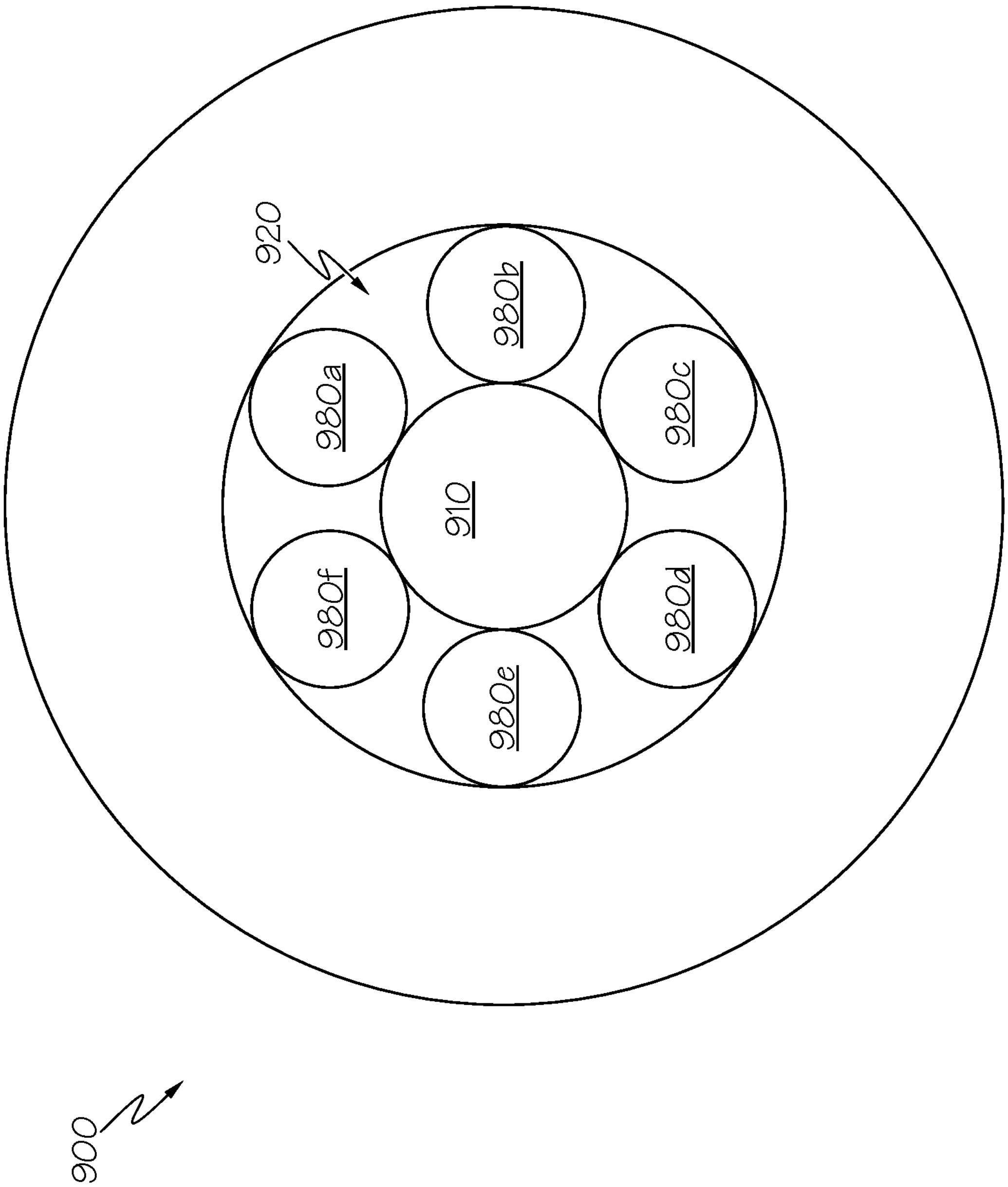
FIG. 10 schematically depicts a cross-sectional view of a comparative hollow-core optical fiber according to the embodiment of Example 4.

Example 4—Modeling Confinement Loss of a Comparative Hollow-Core Optical Fiber A comparative hollow-core optical fiber 900 having a cladding 920 surrounding a hollow-core 910 was modeled to determine the confinement loss of the fiber as a function of wavelength. A cross section of the modeled comparative hollow-core optical fiber 900 of Example 4 is depicted in FIG. 10. The cladding 920 included six capillaries 980*a*, 980*b*, 980*c*, 980*d*, 980*e*, 980*f*. Each capillary 980 had an outer diameter of 23 μm and a wall thickness of 0.4 μm. The substrate 930 had an inner diameter of 81 μm and a wall thickness of 20 μm. As shown in FIG. 10, the structure of the cladding 920 of the comparative hollow-core optical fiber 900 was symmetric with a 60° rotational symmetry or six repetitions.

The confinement loss of the comparative hollow-core optical fiber 900 of Example 4 was modeled using Comsol Multiphysics modeling software. According to the model, the comparative hollow-core optical fiber 900 of Example 4 provided poor confinement of the optical signal to the hollow-core compared to the hollow-core optical fibers of Examples 1-3. In particular, the minimum confinement loss of the hollow-core optical fiber 900 of Example 4 was about 87 dB/km.

The invention claimed is:

1. A hollow-core optical fiber comprising:

a hollow core extending along a central longitudinal axis of the hollow-core optical fiber;

a substrate, the substrate comprising a tubular shape and an inner surface surrounding the central longitudinal axis of the hollow-core optical fiber;

a first cladding positioned between the central longitudinal axis of the hollow-core optical fiber and the inner surface of the substrate, the first cladding surrounding the central longitudinal axis of the hollow-core optical fiber and comprising a Bragg structure, the Bragg structure configured to provide a photonic bandgap operable to confine an optical signal with a wavelength λ propagating in the hollow core of the hollow-core optical fiber, the Bragg structure further configured to provide an anti-resonant effect at the wavelength λ, the anti-resonant effect operable to confine the optical signal at the wavelength λ in the hollow core of the hollow-core optical fiber; and a second cladding positioned between the central longitudinal axis of the hollow-core optical fiber and the inner surface of the substrate, the second cladding surrounding the central longitudinal axis of the hollow-core optical fiber and comprising a plurality of cladding elements, the plurality of cladding elements configured to provide an anti-resonant effect at the wavelength λ, the anti-resonant effect operable to confine the optical signal at the wavelength λ in the hollow core of the hollow-core optical fiber; each of the plurality of cladding elements extending in a direction parallel to the central longitudinal axis of the hollow-core optical fiber and comprising a glass sheet configured as a spiral.

2. The hollow-core optical fiber of claim 1, wherein the second cladding is positioned between the first cladding and the central longitudinal axis of the hollow-core optical fiber.

3. The hollow-core optical fiber of claim 1, wherein the first cladding is in direct contact with the second cladding.

4. The hollow-core optical fiber of claim 1, wherein the first cladding is in direct contact with the inner surface of the substrate.

5. The hollow-core optical fiber of claim 1, wherein the Bragg structure comprises alternating concentric first layers and second layers, the first layers comprising a first refractive index at the wavelength λ and the second layers comprising a second refractive index at the wavelength λ, the second refractive index differing from the first refractive index.

6. The hollow-core optical fiber of claim 5, wherein the Bragg structure comprises 3 or more first layers.

7. The hollow-core optical fiber of claim 5, wherein the Bragg structure comprises 30 or fewer first layers.

8. The hollow-core optical fiber of claim 5, wherein each first layer has a thickness from 0.1 μm to 4.0 μm.

9. The hollow-core optical fiber of claim 5, wherein a difference between the first refractive index and the second refractive index is greater than 0.10.

10. The hollow-core optical fiber of claim 5, wherein the first layers comprise glass and the second layers comprise air.

11. The hollow-core optical fiber of claim 10, wherein the first layers are interconnected.

12. The hollow-core optical fiber of claim 11, wherein the first layers are interconnected by a plurality of ribs extending parallel to the central longitudinal axis of the hollow-core optical fiber.

13. The hollow-core optical fiber of claim 12, wherein each of the plurality of ribs has a width from 0.1 μm to 5 μm.

14. The hollow-core optical fiber of claim 11, wherein the first layers are interconnected by a plurality of tubes extending parallel to the central longitudinal axis.

15. The hollow-core optical fiber of claim 14, wherein each of the plurality of tubes are positioned on radii of the hollow-core optical fiber that do not pass through the plurality of cladding elements.

16. The hollow-core optical fiber of claim 1, wherein each cladding element is spaced apart from adjacent cladding elements in a circumferential direction about the central longitudinal axis.

17. The hollow-core optical fiber of claim 1, wherein each of the plurality of cladding elements extends in a direction parallel to the central longitudinal axis of the hollow-core optical fiber and each of the plurality of cladding elements comprises a capillary.

18. The hollow-core optical fiber of claim 1, wherein the wavelength $\lambda$ is in a range from 350 nm to 8000 nm.

19. The hollow-core optical fiber of claim 1, wherein the first cladding and the second cladding are configured such that a confinement loss of a fundamental mode of the optical signal propagating in the hollow-core optical fiber is less than $10^{-2}$ dB/km at the wavelength $\lambda$.

* * * * *